US012095680B2

(12) United States Patent
Madhavan et al.

(10) Patent No.: US 12,095,680 B2
(45) Date of Patent: Sep. 17, 2024

(54) LANE HANDLING FOR MESSAGE ORDERING BUFFER

(71) Applicant: Chicago Mercantile Exchange Inc., Chicago, IL (US)

(72) Inventors: Ajay Sunderajan Madhavan, Aurora, IL (US); Todd James Borro, Evanston, IL (US); Maximiano J. Martinez, Chicago, IL (US); David Erik Heitman, Mokena, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/113,885

(22) Filed: Feb. 24, 2023

(65) Prior Publication Data

US 2023/0216812 A1   Jul. 6, 2023

Related U.S. Application Data

(63) Continuation of application No. 17/502,164, filed on Oct. 15, 2021, now Pat. No. 11,627,099, which is a
(Continued)

(51) Int. Cl.
*H04L 47/50* (2022.01)
*H04L 47/62* (2022.01)
(Continued)

(52) U.S. Cl.
CPC .......... *H04L 49/9036* (2013.01); *H04L 47/50* (2013.01); *H04L 47/622* (2013.01); *H04L 47/6275* (2013.01)

(58) Field of Classification Search
CPC ... H04L 49/9036; H04L 47/50; H04L 47/622; H04L 47/6275; H04L 47/621;
(Continued)

(56) References Cited

U.S. PATENT DOCUMENTS 7,509,378 B2   3/2009   Goland
8,149,732 B1   4/2012   Borro
(Continued)

OTHER PUBLICATIONS

Extended European Search Report, from EP Application No. 21203529.9, Apr. 7, 2022, EP.
(Continued)

*Primary Examiner* — Johnny B Aguiar
(74) *Attorney, Agent, or Firm* — Lempia Summerfield Katz LLC

(57) ABSTRACT

The disclosed embodiments, collectively referred to as the "Message Ordering Buffer" or "MOB", relate to an improved messaging platform, or processing system, which may also be referred to as a message processing architecture or platform, which routes messages from a publisher to a subscriber ensuring related messages, e.g., ordered messages, are conveyed to a single recipient, e.g., processing thread, without unnecessarily committing resources of the architecture to that recipient or otherwise preventing message transmission to other recipients. The disclosed embodiments further include additional features which improve efficient and facilitate deployment in different application environments. The disclosed embodiments may be deployed as a message oriented middleware component directly installed, or accessed as a service, and accessed by publishers and subscribers, as described herein, so as to electronically exchange messages therebetween.

15 Claims, 5 Drawing Sheets

Related U.S. Application Data continuation of application No. 17/096,004, filed on Nov. 12, 2020, now Pat. No. 11,178,091.

(51) Int. Cl.
  *H04L 47/6275* (2022.01)
  *H04L 49/90* (2022.01)

(58) Field of Classification Search
  CPC ............. H04L 47/6295; H04L 47/6215; H04L 47/629; G06F 9/546
  See application file for complete search history.

(56) References Cited

U.S. PATENT DOCUMENTS

| | | | |
|---|---|---|---|
| 8,954,994 B2 | 2/2015 | Gambino | |
| 9,426,115 B1 * | 8/2016 | Pauls | H04L 51/48 |
| 11,126,483 B1 | 9/2021 | Das et al. | |
| 2003/0110230 A1 | 6/2003 | Holdsworth et al. | |
| 2004/0205141 A1 * | 10/2004 | Goland | H04L 51/226 |
| | | | 709/206 |
| 2006/0294333 A1 | 12/2006 | Michaylov | |
| 2007/0118601 A1 | 5/2007 | Pacheco | |
| 2008/0263564 A1 * | 10/2008 | Gambino | G06F 9/52 |
| | | | 719/314 |
| 2011/0078214 A1 | 3/2011 | Michaylov et al. | |
| 2014/0215492 A1 * | 7/2014 | Ross | G06F 9/546 |
| | | | 719/314 |
| 2018/0069810 A1 * | 3/2018 | Hafri | H04L 51/214 |
| 2018/0167476 A1 | 6/2018 | Hoffner et al. | |
| 2018/0248825 A1 * | 8/2018 | Sedan | H04L 51/214 |
| 2018/0314547 A1 * | 11/2018 | Bak | G06F 9/4881 |
| 2021/0286560 A1 | 9/2021 | Lee | |

OTHER PUBLICATIONS

Tuning MessageMaximum, Oracle, Tuning WebLogic JMS, 2020, page, https://docs.oracle.com/cd/E11035_01/wls 100/perform/jmstuning.html#wp1149750, 1 page.

KA Transactions, Oracle, WebLogic Server Components, 2010, https://docs.oracle.com/cd/E19509-01/820-5892/ref_xatrans/index.html, 2 pages.

* cited by examiner

LANE HANDLING FOR MESSAGE ORDERING BUFFER

PRIORITY

This application is a continuation of and claims priority to U.S. patent application Ser. No. 17/502,164, filed Oct. 15, 2021, now U.S. Pat. No. 11,627,099, entitled MESSAGE ORDERING BUFFER, which is a continuation of and claims priority to U.S. patent application Ser. No. 17/096,004, filed Nov. 12, 2020, now U.S. Pat. No. 11,178,091, entitled MESSAGE ORDERING BUFFER, each of which being incorporated by reference in its entirety.

BACKGROUND

Messaging is a form of loosely coupled, asynchronous, distributed communication between electronic devices, where, in this context, the term "communication" can be understood as an exchange, via an electronic communications medium, of electronic messages, i.e. a discrete units of electronic communication intended by the source, also referred to as a producer or publisher, for consumption by some recipient or group of recipients, referred to as a consumer or subscriber, wherein the source and recipient may be software components coupled with each other, such as via an electronic communications channel such as a bus or electronic communications network. A system for implementing messaging may be referred to as a system, platform, transport, architecture, middleware or combination thereof. The logical and/or physical mode of communication implemented by a messaging system, platform, or middleware may be referred to as a transport.

As messaging platforms form an integral component of a complex software architecture, it is desirable that such platforms be efficient and reliable, e.g., reliably conveying large volumes messages between multiple requestors and recipients with minimal latency, as well provide necessary versatility and features to support deployment in different application environment and in different application operating modes, e.g., to facilitate deterministic operation, and otherwise off load complexity from other architecture components.

DETAILED DESCRIPTION

Figure 1:
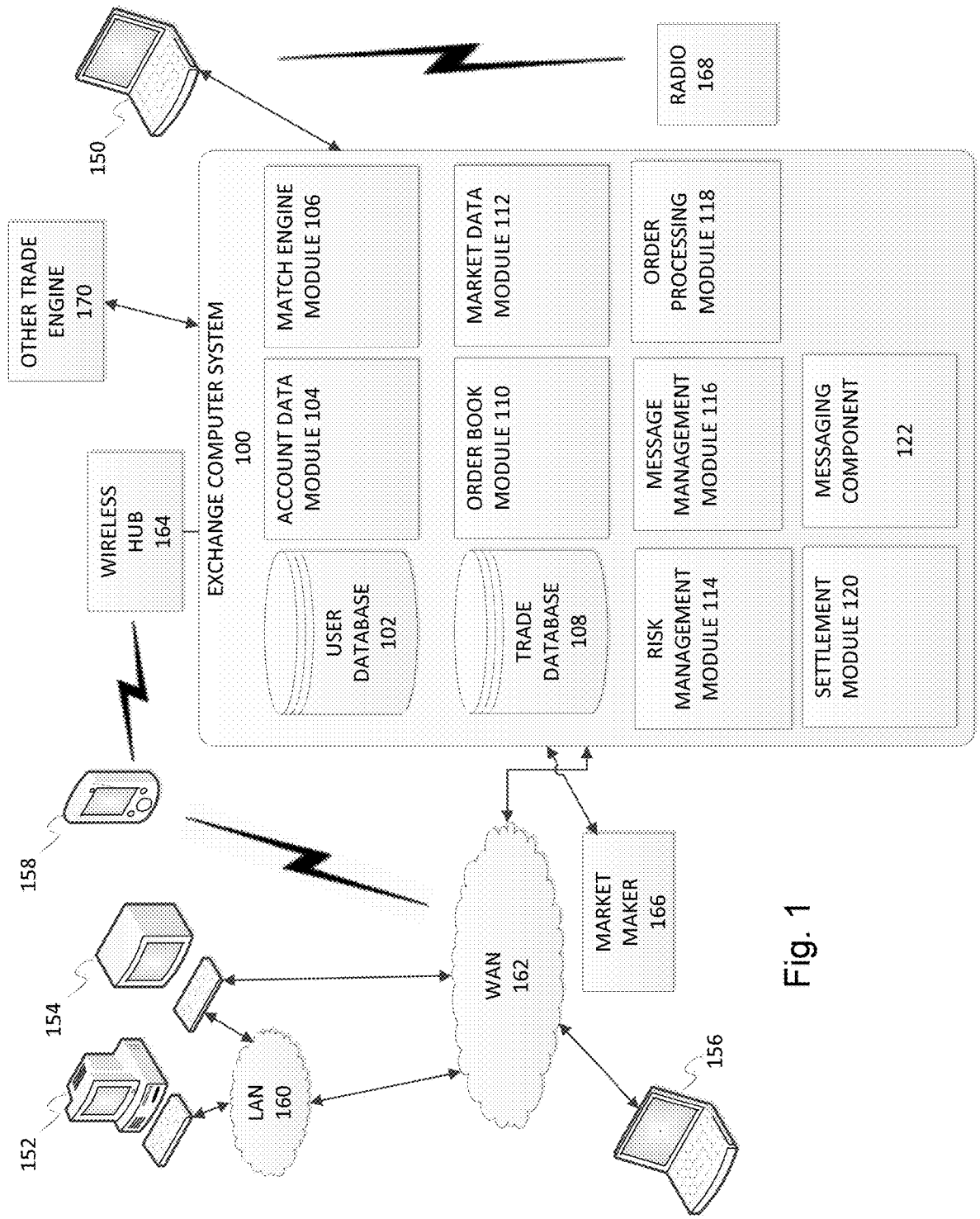
FIG. 1 depicts a computer network system, according to some embodiments.

The disclosed embodiments, collectively referred to as the "Message Ordering Buffer" or "MOB", relate to an improved messaging platform, or processing system, which may also be referred to as a message processing architecture or platform, which routes messages from a publisher to a subscriber ensuring related messages, e.g., ordered messages, are conveyed to a single recipient, e.g., processing thread, without unnecessarily committing resources of the architecture to that recipient or otherwise preventing message transmission to other recipients. The disclosed embodiments further include additional features which improve efficient and facilitate deployment in different application environments. The disclosed embodiments may be deployed as a message oriented middleware component directly installed, or accessed as a service, and accessed by publishers and subscribers, as described herein, so as to electronically exchange messages therebetween.

As will be described below, an exemplary system in which the disclosed embodiments may be deployed is the Front End Clearing system ("FEC") of the electronic trading system provided by the Chicago Mercantile Exchange. FEC is a message processor oriented system which uses a messaging platform for both inter-process and external client/server communications.

As noted above, messaging is a form of loosely coupled, asynchronous, distributed communication between electronic devices, where, in this context, the term "communication" can be understood as an exchange, via an electronic communications medium, of electronic messages, i.e. a discrete units of electronic communication intended by the source, also referred to as a producer or publisher, for consumption by some recipient or group of recipients, referred to as a consumer or subscriber, wherein the source and recipient may be software components coupled with each other, such as via an electronic communications channel such as a bus or electronic communications network.

Message-oriented technologies attempt to relax tightly coupled communication (such as Transport Control Protocol ("TCP") network sockets, Common Object Request Broker Architecture ("CORBA") or Remote Method Invocation ("RMI")) by the introduction of an intermediary component. This approach allows software components to electronically communicate with each other indirectly. Benefits of this include message senders not needing to have precise knowledge of their receivers, the ability to integrate heterogeneous platforms, reduce system bottlenecks, increase scalability, and respond more quickly to change. A system for implementing messaging may be referred to as a system, platform, transport, architecture, middleware or combination thereof. The logical and/or physical mode of communication implemented by a messaging system, platform, or middleware may be referred to as a transport.

One implementation of such an intermediary component for implementing messaging is a message-oriented middleware (MOM). MOM is a software and/or hardware infrastructure supporting sending and receiving messages between distributed systems. MOM allows application modules to be distributed over heterogeneous platforms and reduces the complexity of developing applications that span multiple operating systems and network protocols. The middleware creates a distributed communications layer that insulates the application developer from the details of the various operating systems and network interfaces. Application Program Interfaces ("API"'s) that extend across diverse platforms and networks are typically provided by MOM. This middleware layer allows software components (applications, Enterprise JavaBeans, servlets, and other components) that have been developed independently and that run on different networked platforms to interact with one another. Applications distributed on different network nodes use the application interface to communicate. In addition, by providing an administrative interface, this new, virtual system of interconnected applications can be made reliable and secure. MOM provides software elements that reside in all communicating components of a client/server architecture and typically support asynchronous calls between the client and server applications. MOM reduces the involvement of application developers with the complexity of the master-slave nature of the client/server mechanism There may be two distinct messaging models implemented by messaging software/systems/platforms/architectures: point-to-point; and publish-and-subscribe.

In a point-to-point based messaging system, messages from producers are routed to individual consumers who maintain queues, also referred to herein as buffers, of incoming messages. This messaging model is built on the concept of message queues, senders/producers, and receivers/consumers. Each message is addressed to a specific queue, and the receiving clients extract messages from those queues that are established to hold their messages. While any number of producers can send messages to a particular queue, each message is guaranteed to be delivered, and consumed by one consumer. Queues retain/persist all messages sent to them until the messages are consumed or, possibly, until the messages expire. If no consumers are registered to consume the messages, the queue may hold them until a consumer registers to consume them. The queue may keep track of which messages have been read and which have not.

The publish-and-subscribe model supports publishing messages to a particular message "topic," described in more detail below. Subscribers may register interest in receiving messages published by a publisher on a particular message topic. In this model, neither the publisher nor the subscriber may know about each other. A good analogy for this is an anonymous bulletin board. In software architectures, publish—subscribe is a messaging pattern where senders of messages, called publishers, do not program the messages to be sent directly to specific receivers/consumers, called subscribers, but instead categorize published messages into classes, which may be referred to as topics, without necessarily having knowledge of which subscribers/consumers, if any, there may be. Similarly, subscribers express interest in one or more classes of messages, e.g. register with the messaging platform and define/specify one or more classes/topics for which they wish to receive messages, and only receive messages that are of interest, without necessarily having knowledge of which publishers, if any, there are. The messaging platform typically creates and maintains a queue for each message class/topic for each consumer with registered interest therein, i.e. a given message class/topic may have multiple queues, one for each registered subscriber, wherein a copy of a given message is placed in each queue for consumption by the associated subscriber.

In the publish-subscribe model, subscribers typically receive only a subset of the total messages published, i.e. across all classes/topics. The process of selecting messages by a recipient for reception and processing, e.g., for deciding which messages to receive, is called filtering. There are two common forms of filtering: topic-based and content-based. In a topic-based system, messages are published to "topics" or named logical channels, i.e., dedicated queues which hold those particular messages as described above. Subscribers in a topic-based system will receive all messages published to the topics to which they subscribe. The publisher is responsible for defining the topics to which subscribers can subscribe. In a content-based system, messages are only delivered to a subscriber if the attributes or content of those messages matches constraints defined by the subscriber, i.e., the subscriber is responsible for classifying the messages. In either model, the subscriber is responsible for keeping track of which messages have been read and which have not. A subscriber can be a late joiner and topics/message queues may not maintain history, i.e., older messages may not be persisted. That is, a topic/queue may be ephemeral rather than persistent, i.e., messages are not kept forever even if unread.

There is a timing dependency between publishers and subscribers. The publisher has to create a message topic for clients to subscribe. The subscriber has to remain continuously active to receive messages, unless it has established a durable subscription. In that case, messages published while the subscriber is not connected may be persisted and redistributed whenever it reconnects.

In many publish-and-subscribe systems, publishers post messages to an intermediary message broker or event bus, referred to, as described above, as a messaging platform, component, middleware, etc., and subscribers register subscriptions with that broker, letting the broker perform the filtering. The broker normally performs a store and forward function (a technique in which information is sent to an intermediate station where it is kept and sent, at a later time, to the final destination or to another intermediate station) to route messages from publishers to subscribers. In addition, the broker may prioritize messages in a queue before routing.

In computer science, message queues are software-engineering components used for inter-process communication (IPC), or for inter-thread communication within the same process. They use a queue for messaging—the passing of control or of content. Group communication systems provide similar kinds of functionality.

The message queue paradigm is a sibling of the publisher/subscriber pattern, and is typically one part of a larger message-oriented middleware system. Most messaging systems support both the publisher/subscriber and message queue models in their API, e.g. Java Message Service ("JMS").

Message queues provide an asynchronous communications protocol, meaning that the sender and receiver of the message do not need to interact with the message queue at the same time. Messages placed onto the queue may be stored until the recipient retrieves them. Message queues may have implicit or explicit limits on the size of data that may be transmitted in a single message and the number of messages that may remain outstanding on the queue.

In a typical message-queueing implementation, a system administrator installs and configures message-queueing software (a queue manager or broker, also referred to as a message oriented middleware described above), and defines a named message queue. Or they register with a message queuing service. An application then registers a software routine that "listens" for messages placed onto the queue. Second and subsequent applications may connect to the queue and transfer a message onto it. Different messaging platforms are available and each may offer different feature or may otherwise be designed for implementation in particular environments or for particular purposes.

The queue-manager software may store the messages until a receiving application connects and then calls the registered software routine. The receiving application then processes the message in an appropriate manner.

There are often numerous options as to the exact semantics of message passing, including:

Durability—messages may be kept in memory, written to disk, or even committed to a DBMS if the need for reliability indicates a more resource-intensive solution;

Security policies—which applications should have access to these messages;

Message purging policies—queues or messages may have a "time to live";

Message filtering—some systems support filtering data so that a subscriber may only see messages matching some pre-specified criteria of interest;

Delivery policies—do we need to guarantee that a message is delivered at least once, or no more than once;

Routing policies—in a system with many queue servers, what servers should receive a message or a queue's messages;

Batching policies—should messages be delivered immediately, or should the system wait a bit and try to deliver many messages at once;

Queuing criteria—when should a message be considered "enqueued", e.g., when one queue has it, or when it has been forwarded to at least one remote queue or to all queues; and Receipt notification—A publisher may need to know when some or all subscribers have received a message.

Oracle WebLogic Server is a Java EE application server currently developed by Oracle Corporation. Oracle acquired WebLogic Server when it purchased BEA Systems in 2008. A messaging service, for example, the Java® Messaging Service (JMS), which may be implemented by the Oracle WebLogic server, is an application program interface (API) that supports the formal communication, known as messaging, between computers in a network. As mentioned above, messaging is the creation, storage, exchange, and management of messages between producers who send/publish the messages to a queue of a destination and consumers who receive, subscribe, and browse the messages from the queue of the destination. Here, a message can be, but is not limited to, text, image, voice, telex, fax, e-mail, paging, and other suitable electronic data describing events, requests, and replies over a communications network. A distributed destination is a set of destinations (queues or topics) that are accessible as a single, logical destination to a client. The destinations can be hosted on a messaging server.

The JMS specification specifies ordered message delivery in a very strict sense by defining order between a single instance of a producer and a single instance of a consumer. It does not take into account that there may be multiple producers within a single application acting as a single producer. The case where there are multiple consumers acting in concert is even more common. Moreover, when consumers reject messages (recover or transaction rollback), other messages from the same producer can be delivered to another consumer for processing.

In some applications, such as trading, electronic commerce and other applications where deterministic behavior, e.g. the order in which operations and/or messages are processed, is important, messaging services may be required to ensure that a set of messages related by their ordering that are queued for delivery to subscribers are all delivered to any single subscriber or otherwise consumed, by one or more subscribers, in a particular order, e.g. the order in which they were placed into the queues by the publisher and/or the same order as delivered to/consumed by another consumer. For example, a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions.

Business transactions, as defined by the associated business rules, may be characterized as deterministic in that they can be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. Accordingly, messages related to such transactions may need to be communicated and consumed in a particular order to ensure an expected and/or consistent result of the subsequent processing thereof.

One method/mechanism of ensuring ordered receipt of queued messages is referred to as "unit of order" (UOO). UOO allows a stand-alone message producer/publisher, or a group of producers/publishers acting as one, to group messages into a single unit. It guarantees that all of the queued messages are not only delivered to consumers/subscribers in a particular order, e.g. the order of creation, but also that they are processed by the consumers in that particular order. Such a group of messages is referred to as a unit-of-order and is delivered to consumers as one unit and, in one implementation, only one consumer can process messages from the unit at a time (no parallel delivery). In one implementation, messages of a unit-of-order sent to a distributed destination are on a physical member of the distributed destination only one at a time, i.e., the messages will not reside at more than one member at any given time. Generally, the only mandatory property of the feature is ordered processing, which requires that messages from a unit-of-order can only be processed sequentially in the particular defined order, e.g. the order in which they were created. In one implementation, the processing of a single message is complete when it is acknowledged, committed, recovered, or rolled back. Until message processing for a message is complete, the remaining unprocessed messages for that unit-of-order are blocked.

Current queue implementations of the JMS API, however, cannot guarantee ordered message processing because, while a consumer is processing one message from a queue, the next message is delivered to another consumer for processing, which results in parallel processing of the messages. Accordingly, where both messages may be sent by the same producer, the ordered processing rule is violated. Further, while a message $M_i$ is delivered as part of a transaction, the next message $M_{i+1}$ is delivered outside of this transaction. $M_{i+1}$ is then acknowledged. If the transaction rolls back, $M_i$ will be redelivered to the Queue and be processed after $M_{i+1}$. Processing order of messages is different from arrival order when: a) The Queue has sorting criteria (such as priority). b) If there are multiple consumers on the Queue and one of them does recover/rollback, less recent messages may be processed by other consumers before these messages are redelivered.

In addition, although the Java Message Service Specification provides for an ordered message delivery, it only stipulates ordered message delivery between a single instance of a producer and a single instance of a consumer.

Apache ActiveMQ Artemis is an open source message broker, i.e. Java based messaging server, written in Java together with a full Java Message Service (JMS) client.

IBM MQ is another message-oriented middleware software product, published by IBM, originally called MQSeries and now known as WebSphere MQ, which allows independent and potentially non-concurrent applications on a distributed system to securely communicate with each other, using messages. While MQ provides either an overall exclusive, i.e., one consumer, mode for consumption of messages or non-exclusive mode, MQ does not allow for exclusive consumption by a consumer within a group of messages, e.g. to preserve the order of consumption of those messages. Furthermore, MQ does not provide true support for batching.

Apache Kafka, or Kafka, is another messaging platform which provides a scalable, fault-tolerant, publish-subscribe messaging system that enables distributed applications. Kafka is an open-source stream-processing software platform developed by the Apache Software Foundation, written in Scala and Java. Kafka provides a unified, high-throughput, low-latency platform for handling real-time data feeds. Kafka can connect to external systems (for data import/export) via Kafka Connect and provides Kafka Streams, a Java stream processing library. Kafka uses a binary TCP-based protocol that is optimized for efficiency and relies on a "message set" abstraction that naturally groups messages together to reduce the overhead of the network roundtrip. This "leads to larger network packets, larger sequential disk operations, contiguous memory blocks [ . . . ] which allows Kafka to turn a bursty stream of random message writes into linear writes. Kafka is based on the commit log, and it allows users to subscribe to it and publish data to any number of systems or real-time applications. Generally, Kafka stores key-value messages that come from arbitrarily many processes called producers. The data can be partitioned into different "partitions" within different "topics". Within a partition, messages are strictly ordered by their offsets (the position of a message within a partition), and indexed and stored together with a timestamp. Other processes called "consumers" can read messages from partitions.

Amazon Simple Queue Service (Amazon SQS), another messaging platform, is a distributed message queuing service introduced by Amazon.com. It supports programmatic sending of messages via web service applications as a way to communicate over the Internet. SQS is intended to provide a highly scalable hosted message queue that resolves issues arising from the common producer-consumer problem or connectivity between producer and consumer. Amazon SQS can be described as commoditization of the messaging service. As opposed to IBM WebSphere MQ, described above, and Microsoft Message Queuing, users do not need to maintain their own server. Amazon does it for them and sells the SQS service at a per-use rate. Amazon SQS guarantees at-least-once delivery. Messages are stored on multiple servers for redundancy and to ensure availability. If a message is delivered while a server is not available, it may not be removed from that server's queue and may be resent. Amazon SQS generally does not guarantee that the recipient will receive the messages in the order they were sent by the sender. If message ordering is important, it is required that the application place sequencing information within the messages to allow for reordering after delivery. A relatively new FIFO option is available which does allow for ordering guarantees, e.g., for applications that require messages to be processed in a strict sequence and exactly once, using FIFO queues which are designed to ensure that the order in which messages are sent and received is strictly preserved and that each message is processed exactly once. SQS does not automatically delete messages once they are sent. When a message is delivered, a receipt handle is generated for that delivery and sent to the recipient. These receipts are not sent with the message but in addition to it. SQS requires the recipient to provide the receipt in order to delete a message. This feature is new as of 2008 where only the message ID was required for message deletion. Because the system is distributed, a message may be sent more than once. In this case, the most recent receipt handle is needed to delete the message. Once a message is delivered, it has a visibility timeout to prevent other components from consuming it. The "clock" for the visibility timeout starts once a message is sent, the default time being 30 seconds. If the queue is not told to delete the message during this time, the message becomes visible again and will be present. Each queue also consists of a retention parameter defaulting to 4 days. Any message residing in the queue for longer will be purged automatically. The retention can be modified from 1 minute up to 14 days by the user. If the retention is changed while messages are already in the queue, any message that has been in the queue for longer than the new retention will be purged.

Messaging systems/platforms/middleware comprise message queues, operating as described above, and may further contain a message router/routing engine. In messaging systems without a message router, publishers/producers can designate messages containing particular content, e.g. using a name space, and manage the subscriptions and transmission of messages to subscribers directly. In contrast, using a message router, a messaging system may implement a routing model wherein the message router/routing engine discerns the message content and manages the subscriptions/message delivery, i.e., the publisher delivers the message to the routing engine, e.g. to a queue coupled with the routing engine, and the routing engine determines who is subscribed and provides the messages thereto, e.g. by delivering the message to a queue for each subscriber. A message router is a basic architectural pattern of a messaging system used fundamentally for connecting different message channels, e.g. publisher/producer queues and subscriber/consumer queues. A router consumes a message from one message channel/queue and republishes it to a different channel/queue based on specified conditions. For example, a Content-Based Router (CBR) reads the content of a message and routes it to a specific recipient based on its content.

In electronic trading systems, messaging services are used for inter- as well as intra-process communication, within the electronic trading system, i.e., between the various software components of the system, and between those components and external entities, e.g., via an electronic communications network. In one implementation, a messaging service is used to facilitate electronic communications between the electronic systems of clearing firms and the Front End Clearing ("FEC") system of the electronic trading system as well as within the FEC system. As described in more detail below, FEC is a trade and allocation management system that clearing firms electronically interact with to send and receive electronic messages to/from the CME trading platform regarding the clearing of trades. In one embodiment, the FEC System is a web-based application that provides clearing member firm's back office staff with an integrated method for entering and processing a variety of trade types, such as block trades, differential spreads, Exchange of Futures for Related Positions (EFRP), Fungibles, Pit Trades, Transfer Trades, etc.

In one implementation, end users, e.g. clearing firms, use MQ inbound/outbound queues to receive and send messages with CME. MQ is a message-oriented middleware product published by IBM Corp. which allows independent and potentially non-concurrent applications on a distributed system to securely communicate with each other, using messages.

In prior implementations, WebLogic was used as a medium of communication between internal components in the FEC. End users of the messaging API did not connect to WL directly but instead connected to two or more secured individual IBM MQ queues: at least one for inbound to CME messages, and at least one for outbound from CME messaging traffic. CME's Clearing Message Broker, as described in U.S. Pat. No. 8,149,732, incorporated by reference herein, reads from the individual MQ queues and "routes" to a lesser number (similar to multiplexing) of WebLogic queues for processing by FEC. After FEC processing, which typically involves multiple internal intermediate message passing steps via WebLogic, the response is routed by CMB to the appropriate individual MQ queue. In effect, Weblogic coupled the FEC with the CMB and the CMB coupled WebLogic with the MQ queues.

The disclosed embodiments, which, as noted above, may be referred to herein as a Message Ordering Buffer ("MOB"), may be used in conjunction with MQ or as a replacement therefore, to carry and/or manage messages between the FEC and the clearing firms via the CMB.

In one implementation, the disclosed embodiments may be implemented within the FEC, e.g., to replace WebLogic, wherein end users/clearing firms connect to the MQ queues, at least one for inbound to CME messages and one for outbound from CME messages, and the CMB "routes", or multiplexes, messages between the individual MQ queues and a number of, e.g., lesser than the number of MQ queues, internal MOB namespaces for processing by the FEC systems and communication thereby with the end users. In one embodiment, the disclosed embodiments integrate with the CMB allowing the CMB to communicate therewith so as route message to and from the disclosed embodiments.

The disclosed embodiments route messages from a clearing firm's inbound MQ queues to FEC. The disclosed embodiments enable FEC to process messages using multiple processing threads while preserving order of related messages, i.e., deterministic operation. CMB also reads from MOB to transfer messages from FEC to MQ queues of the clearing firms. FEC is a distributed system with multiple components, each of which may interact with the disclosed embodiments, for inter-component communication. In an alternative implementation, the disclosed embodiments replace MQ as well as Weblogic.

In one implementation, a clearing firm may host its own local MQ queue manager which connects to a secure firm-specific channel on the trading system's, e.g., CME's, firm-facing MQ server which is connected, via the CMB, to the disclosed MOB, and via the disclosed MOB, to the FEC.

In particular, the disclosed embodiments provide a messaging architecture/platform which implements a messaging component for providing a messaging function among multiple software components which need to communicate with one another and managing messaging queues therefore, e.g. creating queues, facilitating connections with publishers/producers and subscribers/consumers, and, in one embodiment, routing messages. Furthermore, the disclosed embodiments provide various optional functions/implementations/configurations to facilitate advanced messaging capabilities in particular deployments.

The disclosed embodiments implement a communications model which is similar to a point to point model in that there is one component/process, implementing multiple ordered queues, through which multiple producers and consumers may communicate, wherein each consumer has their own queue, e.g. each consuming thread of a process has an associated buffer/queue that it reads from. The disclosed embodiments implement persistent messaging whereby messages are persisted until they are consumed and removed once consumed.

In one embodiment of the MOB, the producer (input) and consumer (output) queues are combined with a routing function/engine. In particular, the act of publishing a message is the act of delivering that message to the routing engine of the MOB and the act of consuming a message is the act of consuming that message from the routing engine, effectively eliminating the need for a producer/publisher to perform a write operation to a queue and the need for a consumer/subscriber to perform a read operation from a queue. In other words, a producer delivers a message to the MOB and the MOB determine which queue in which to place the message. A consumer requests a message from the MOB and the MOB determines from which queue and which message therein to provide in response.

In addition, the disclosed embodiments provide deterministic, i.e. similar to unit of order, operation to ensure that incoming messages from a producer which are related to one another, e.g. deterministically related, are all processed by a consumer in their designated sequence/ordering. Multi-threaded consumers may be constrained such that only one thread may process such related sets of messages.

In one embodiment, the disclosed system implements a dynamic namespace to allow producers and consumers to identify and interact with particular queues. As used herein, a namespace both generally refers to the overall ability to refer to each of a multitude of queues using a hierarchical symbolic reference as described but also is a generic reference to a single instance of a hierarchical symbolic reference for a particular queue. A namespace is a set of symbols (names), typically arranged in a hierarchical syntax, that are used to identify and refer to objects, such as queues/buffers, of various kinds. A namespace ensures that all of a given set of objects have unique names so that they can be easily identified. In the disclosed embodiments, a given queue, or a set of queues, may be referred by name such as a.b.c or a.b.d. The names may be linked or otherwise related to, or derived from, the content of the messages stored in the queue or set of queues, wherein queue "a" stores content "a," or a queue set "a" may include queues "a.b" storing content "a.b" and "a.c" storing content "a.c," etc. Where the content stored in a queue may be related to content stored in another queue, e.g., a sub-queue of a set of queues, such as via a hierarchical or other arrangement/relationship, the queue names may denote the relationship, e.g., a.b., a.b.c, a.b.d, etc. A producer may designate a queue as containing particular content, e.g. a.b.c, and subscriber/consumers may subscribe to particular content of interest, such as a.b.c or a.b.d, etc., wherein, for example, content c and d have a similar relationship to content a and content b. In one embodiment a wild card, e.g., an asterisk (*) (also known as "fan out"), may be supported enabling one to refer to a.b.* so as to easily refer to both queues a.b.c and a.b.d, e.g., in a single operation, reference or command.

The disclosed embodiments are configurable as to the features and functions provided thereby. In one embodiment, upon instantiating or otherwise initiating the MOB, a configuration file or parameter set is read or otherwise accessed which enables or otherwise configures particular features, function or operating modes as will be described. These features/functions may include dynamic lane partitioning, exclusive/non-exclusive namespace access, Native Batch Read/Write, Implicit Commit, Proxy Mode, Lossless Bridge Mode, Auto client Session and Connection Scaling, Read and write rate limiting, out-of-memory resistance, True Poll Free Read/Write, Time Bases Duplicate Detection, and History Based Duplicate Detection.

In one implementation, the disclosed embodiments implement dynamically created sub-queues of a named queue, referred to as "lanes," which are used to isolate related messages or otherwise isolate a particular consumer thread within, i.e., to consume messages from, the same named queue. As will be described, lanes enable multiple consumers, e.g., multiple consumer threads, to read from the same name space but each is confined to reading from a particular set of lanes, i.e., each lane gets bound to a particular consumer on a first come first served basis. In one embodiment, a producer must be aware that more than one consumer is interested in the same namespace/queue and publish its content to a sufficient number of lanes. Lanes are dynamically created, i.e., only when there are messages queued, and removed when there are no more messages left to be read.

By limiting each lane to a particular consumer, the disclosed embodiments prevent the consumers from stepping over one another. In particular, when a consumer, e.g., one of set of process threads, wishes to receive messages, it may specify a particular namespace from which it wishes to consume messages. Upon receiving the specification, the disclosed embodiments bind the one of the lanes of the queue to that consumer, i.e., the consumer is provided with the first message available from an unbound lane of the queue and thereafter that lane is bound to the consumer as described. As long as the consumer continues to read messages, i.e., does not commit the transaction, it will continue to receive messages from that lane, e.g., it will continue to receive "like" messages, and no other consumer will have access to that lane. That is, a lane gets bound to the consumer as long as that consumer continues to read in a transaction (no transaction boundary action: roll backs or commits) and there are messages available. Lanes are bound to a consumer for the duration of a transaction as opposed to binding a lane to a consumer for a lifetime of lane or consumer which may result in sub-optimal resource utilization.

In contrast, for example, Apache Kafka implements static partitioning wherein a lane is bound to a consumer at start up time, as opposed to at transaction time. WebLogic, implementing UOO, binds a lane to a consumer as long as there are messages in the lane waiting to be read.

MOB binds a lane to a consumer for the duration of a transaction, i.e., as long as the transaction is not completed, and, upon completion of the transaction, releases the lane so that it may be bound to another (or the same) consumer for another transaction. This ensures that the consumer can read all related messages in the order in which they are queued without another consumer also reading those messages, i.e. it ensure deterministic operation similar to UOO.

While binding a lane to a consumer ensures deterministic operation, the disclosed embodiments ensure that such exclusive access does not starve out other consumers from reading from that same lane. In other systems, such as WebLogic, which do not have lanes, the bound consumer would continue to be bound, i.e., have mutually exclusive access, to a queue as long as there are messages in that queue. This mutual exclusivity is required by WebLogic to implement UOO because WebLogic implements a message pre-fetch function, a given queue may be continually populated with more messages when pre-fetching is used which would keep the consumer bound, potentially starving out other consumers. Another example of a system that binds a consumer to a queue indefinitely is ActiveMQ via its Message Groups function. The disclosed embodiments only bind a lane to a particular consumer for the duration of the transaction, upon completion of which frees the lane to be read by another consumer even when there are additional messages to be read.

The disclosed embodiments also ensure fairness to multiple consumers when a producer/publisher sends, e.g., dumps, a lot of messages into a queue for the same UOO. Fairness is a separate concern from starvation and answers the question: given a set of lanes with messages available, which is next to be read? In particular, some large clients may "dump" a bunch of messages for their own numerous clients, resulting in a large number of lanes (greater than the number of available consumers) with a large numbers of messages available. Just after this "dump", a smaller client may write messages for a much smaller set of lanes. Without fairness, the lanes are made available for consumption in order of next-available-message insertion, meaning all of the messages from the big dump (which may take a non-negligible amount of time for the Message Processing System (FEC) to process), will be processed before any of the small client's lanes are read from and processed. With fairness, all groups with messages available for consumption are made available to consumers in a round-robin order, regardless of the insertion time of the next-available-message.

In the disclosed embodiments, in contrast, once a consumer completes their transaction, regardless of remaining messages, the lane becomes unbound and available to be accessed by a different consumer. In other words, when a particular queue gets backed up due to a large influx of messages, wherein the consumer is unable to keep pace with the producer, the disclosed embodiments will not continue to bind the lane to the consumer to the exclusion of other consumers. Effectively, the consumer, via the completion of a transaction, can control its exclusive access to a given lane. Binding a lane for the shortest possible duration may be important for work distribution in a Message Processing System (such as FEC) running on multiple computers simultaneously, with the instance on each computer consuming from many different queues simultaneously. If the duration of binding is too long, then it's possible for the number of lanes with available messages to be bound to a single instance on a single computer, which does not have sufficient resources to process all of the lanes simultaneously, while another instance on another computer has underutilized resources, resulting in lower performance as measured by throughput for the affected groups As noted above, the disclosed embodiments implement a namespace to allow producers and consumers to identify and interact with particular queues. In one implementation, which may be implemented alone or in conjunction with other embodiments/implementations disclosed herein, the disclosed embodiments further allow namespaces, i.e., queues, to be configured in three modes of operation, connoted by the number of lanes configured for the particular namespace: exclusive, non-exclusive and determined based on message attributes.

In the exclusive mode, where only one lane is configured for a given namespace regardless of the number of consumers attempting to read, then only a single "read" operation can be in progress at any time, i.e., the lane will be bound to one consumer. Many consumers can attempt to read, but they will not be returned any messages until the current in-progress read has completed, i.e. the current consumer has committed their transaction and completed their read operation and the lane becomes unbound and available to bind with another consumer. This mode ensures strictly sequential processing within a given namespace while preserving support for multiple consumers, and would be useful for fault tolerant deployments of the consuming application. This mode allows for additional client redundancy and fault tolerance patterns while preserving strict ordering.

In the non-exclusive mode, where the number of lanes is configured to be less than or equal to 0, then there is no limitation to the number of consumers that may have "read" operations in-progress simultaneously or otherwise in parallel, i.e., the lane does not bind with any one consumer. The result of this is that the consumers may complete processing at different times, further resulting in a different ordering of messages after consumption than was present in the namespace.

In the Hybrid mode, the access mode is determined by the message attribute, e.g., the UNIT_OF_ORDER attribute, where the number of lanes is greater than 1:

During writes, the UNIT_OF_ORDER attribute, if not a NULL value, for each message, similar to a "group name" or "partition key", will be used to dynamically determine a lane to write the associated message. The value is transformed to a Lane ID by being passed to a hash function whose numerical output is evaluated modulo the current "number of lanes" of the namespace. Consumption from each such lane will be identical to the exclusive mode, i.e., the lane is bound to a particular consumer for the duration of the transaction. The overall effect, at an entire namespace level, will allow consumption to proceed with a partial degree of parallelism, as multiple "read" operations from multiple exclusive lanes may be in-progress simultaneously.

If no UNIT_OF_ORDER attribute is provided (or otherwise has an intentional or default NULL value), then the message will be written to a special non-exclusive Lane, which cannot be bound to any particular consumer, from which messages can be consumed by multiple consumers in parallel without restriction, i.e. akin to the non-exclusive mode of operation described above.

While other messaging platforms may provide a subset of these modes of operations, e.g. IBM MQ and other JMS implementations provide an exclusive mode of operation while WebLogic provides a non-exclusive mode of operation, other platforms do not enable configurable selection among all three operating modes. Furthermore, the exclusive operating mode enables multiple consumer clients to be allowed to request messages while only fulfilling a single request at a time until that read has been committed. The configurability of the disclosed embodiments allows a single platform to be used for multiple use cases in a distributed system.

In most message platform implementations, consumers read one message from a queue at a time. Accordingly, the limit on the rate at which a consumer can read messages from a queue is typically a function of the latency of the network over which the read operations are communicated from the consumer to the platform and the messages are communicated from the platform to the consumer.

In one implementation, the disclosed embodiments implement a batch function which allows a consumer to specify an intention to read a set number of messages in a single operation. Where a given lane does not have enough messages available to meet the request, the disclosed embodiments automatically reads from additional lanes in sequence, i.e., as each lane is depleted, so as to satisfy requested number of messages. In one embodiment, all such lanes used to satisfy the request will be bound to that consumer.

To improve read performance, other platforms, such as WebLogic, implement a pre-fetch function which allows a consumer to pre-fetch from a given lane but not across lanes. To read a different lane, an additional transaction is needed. Furthermore, WebLogic does not know how many messages a consumer intends to read and provides no mechanism for a consumer to specify the number of messages it intends to read.

In the case of read and write operations, the disclosed embodiments allow a producer/publisher to write a specified number of messages to a queue with a single TCP call. This is not offered by any other platform.

Generally, the read interface of the disclosed embodiments is, from the consumer's perspective, based on the function of reading a batch of messages as opposed to single-message based. This allows some of the overhead costs associated with each request, such as network latency, to be amortized across multiple messages (all messages in a batch), rather than being incurred for each message. A consumer/client generates a read request which specifies a set of input parameters, such as name, timeout, container into which to read messages, etc., and submits their request to the read interface to invoke a read transaction/operation. A read transaction/operation is performed by the server based on the request, invoked either locally, e.g., within the same process, or remote, e.g., over a network. The server then returns the result of the read operation to the requesting client including the number of messages read, with those message being stored in the specified container.

Similarly, the write interface of the disclosed embodiments, from a producer perspective, only operates on batches of messages. All messages in the provided batch are written using the implied transactional context for the provided namespace. In particular, a producer submits a write request, specifying a set of input parameters, e.g., name, container containing messages to be written, etc., to the write interface thereby invoking, locally or remotely, a write operation which is then performed the server which then returns a result confirming the write operation is completed.

In other messaging platforms, such as Apache Kafka, explicit read batching is only supported in terms of size, not message count, i.e., a consumer can, for example, "Read the next 3000 bytes, if available" but cannot, "read the next 2 messages, if available". With regards to write operations, write batching is implicit when using the java client, not explicit. A client thread can choose when to "flush", i.e., "finish and send" a batch but does not have exclusive control over the implicit batch, meaning that messages from other transactions may be comingled in the batch.

Amazon SQS supports explicit read and write batching with a limit of 10 messages per batch. For read operations, SQS only supports transaction patterns of one phase commit for read (via an explicit Delete request) with batches. SQS does not support transactions, e.g., it only supports zero phase commit, for batches from producers.

The disclosed embodiments allow a consumer to specify maximum batch size at the count level, do not allow messages from other transactions or threads to be comingled in an explicit batch, and do not impose a limit on batch size.

Generally, the disclosed embodiment's batch integration with transactions, as well as their batch size semantics, allows a producer and consumer to interact with batching at an abstracted, transport agnostic level.

In many cases, consumers are reading messages, e.g., from the disclosed MOB, for the purpose of storing those messages in a database via a database transaction. As discussed above, in a publish and subscribe model, messages, once read from a lane or queue, are removed from that queue. Accordingly, it may be important for a consumer to confirm that a read message is successfully stored in a database before permitting that message to be deleted from a given lane/queue. That is, a consumer's interactions with a lane or queue may reflect the database transactions that consumer is performing with respect to a database. As will be described, this may take the form of a commit operation back to the disclosed MOB, confirming to the MOB that the consumer has completed whatever processing operation for which it was reading data from the MOB.

Generally, a database transaction symbolizes a unit of work performed within a database management system (or similar system) against a database, and treated in a coherent and reliable way independent of other transactions. A transaction generally represents any change in a database. Transactions in a database environment have two main purposes: to provide reliable units of work that allow correct recovery from failures and keep a database consistent even in cases of system failure, when execution stops (completely or partially) and many operations upon a database remain uncompleted, with unclear status; and to provide isolation between programs accessing a database concurrently. If this isolation is not provided, those programs' outcomes are possibly erroneous.

In a database management system, a transaction is a single unit of logic or work, sometimes made up of multiple operations. Any logical calculation done in a consistent mode in a database is known as a transaction. One example is a transfer from one bank account to another: the complete transaction requires subtracting the amount to be transferred from one account and adding that same amount to the other.

A database transaction, therefore by definition, must be: atomic (it must either complete in its entirety or have no effect whatsoever); consistent (it must conform to existing constraints in the database); isolated (it must not affect other transactions); and durable (it must get written to persistent storage). Database practitioners often refer to these properties of database transactions using the acronym ACID.

In database management, saving data changes is known as a commit and undoing changes is known as a rollback. A commit is the making of a set of tentative changes permanent and provides the Durability aspect of an ACID transaction. A popular usage is at the end of a transaction. A commit is an act of committing. A one-phase commit (1 PC) is a standardized protocol used in a non-distributed system (only one host/processing entity) and ensures a given transaction either succeeds entirely or not at all. A two-phase commit (2 PC) is a standardized protocol that ensures that a database commit is implemented in the situation where a commit operation must be broken into two separate parts, e.g. for distributed transactions, i.e., database transactions in which two or more network hosts are involved.

In particular, in a 2 phase commit ("2PC") protocol, an intermediary object, device or component, sometimes referred to as a coordinator, is required in a distributed transaction, i.e. a transaction involving multiple interconnected processing components, each of which may be responsible for processing a portion, e.g. sub-transaction, of the distributed transaction. As its name implies, the coordinator arranges activities and synchronization between distributed servers, each of which, for example, may be storing a database involved in the transaction. The two-phase commit (2PC) ensures that all of the sub-transactions of the distributed transaction are all completed, e.g. data they wish to store in a given database is successfully stored, or none of them are completed, i.e. if one fails they all fail. 2PC is generally implemented as follows:

Phase 1—Each server that needs to commit data writes its data records to a log. If a server is unsuccessful, it responds with a failure message. If successful, the server replies with an OK message; and Phase 2—This phase begins after all participant servers respond OK. Then, the coordinator sends a signal to each server with commit instructions. After committing, each server writes the commit as part of its log record for reference and sends the coordinator a message that its commit has been successfully implemented. If a server fails, the coordinator sends instructions to all servers to roll back the transaction. After the servers roll back, each sends feedback that this has been completed; wherein:

one node is a designated coordinator, which is the master site, and the rest of the nodes in the network are designated the participants. The protocol assumes that there is stable storage at each node with a write-ahead log, that no node crashes forever, that the data in the write-ahead log is never lost or corrupted in a crash, and that any two nodes can communicate with each other. The last assumption is not too restrictive, as network communication can typically be rerouted. The first two assumptions are much stronger; if a node is totally destroyed then data can be lost. The protocol is initiated by the coordinator after the last step of the transaction has been reached. The participants then respond with an agreement message or an abort message depending on whether the transaction has been processed successfully at the participant.

Advantageously, the 2PC protocol makes the data consistent and available, either all the databases get an update or none do. This protocol further ensures that the databases are always synchronized. However, 2PC is a blocking protocol; the failure of a single node blocks progress until the node recovers. Moreover, if the transaction coordinator fails, then the database is left in an inconsistent state and only recovers once the coordinator recovers. This leads to another drawback as the protocol's latency depends on the slowest node. Since it waits for all the nodes to send acknowledgment messages, a single slow node will slow down the entire transaction.

Accordingly, most message processing follows the example sequence in a loop: Read→Process (probably a database action)→Write resulting messages→Commit (1 PC or 2 PC usually in the sequence database or processing commit, write commit, Read Commit for 1 PC to avoid message loss).

In one implementation, the disclosed embodiments, in contrast, save on network calls by combining a commit operation from a consumer (whether using a 1 PC or 2 PC protocol) to the source (where the messages are read from), e.g., the MOB, by coupling the next read on the loop with that commit. This commit operation may be implemented using a java method invocation, typically across the network using the same Remote Procedure Call protocol as the read/write/etc. operation. This combination of the commit operations with next read may be referred to as an "implicit commit" or "−1 PC". In one implementation, the sequence of operations may be:

1. Commit previous transaction if any, start a new one and read a message
2. Process and commit processing, e.g., the consumer performs its internal operations, database interactions, etc.
3. Write messages in 0 PC (commit as soon as you write), e.g. by the consumer such as where the consumer is also a producer of the resulting messages for the next step in processing or to be returned to the initiating entity for the overall business transaction, etc.

When combined with batch read and write capabilities, described in more detail elsewhere herein, the processing of messages can be significantly scaled up. In particular, for each message, this combination of commit modes, in terms of average latency, saves 2*(average network latency from consumer to messaging system). When this commit combination is combined with batch writes, average latency additionally decreases by (average write batch size resulting from each message read))*(average network latency from consumer to messaging system). When this commit combination is combined with batch reads, average latency additionally decreases by (average read batch size)*(average network latency from consumer to messaging system).

A typical 1 phase commit may implement the following sequence for both read and write:

Read→Process→Write→Commit "Write"→Commit "Process"→Commit "Read"→Read Next

In contrast, a −1 phase commit for read, 0 phase commit for write, according to the disclosed embodiments, implements the following sequence performed by a consumer with respect to its interaction with disclosed MOB:

Read→Process→Write & Commit "Write"→Commit "Process"→Commit "Read" & Read Next

While combining the commit of a prior read transaction with the subsequent read operation of the next transaction has not been implemented in prior systems, such system may use a pre-fetch function, which, as described elsewhere herein, may have its own disadvantages, to achieve similar savings in network calls.

In particular, a prefetch operation forces a predefined number of messages to be pushed to the consumer before being requested. This may result in: extra processing to redistribute the prefetched messages to another consumer if the consumer, to which the prefetched messages were sent, fails; if messages which are part of a UOO are pushed to the consumer as part of a prefetch operation, they become unavailable for distribution to other, otherwise available, consumers long after the transaction boundary is complete, i.e. the UOO is released and messages with this UOO are made available for consumption by other consumers; and UOO affinity, referred to as "sticky UOO", may be a consequence of the prefetch operation as once messages belonging to a certain UOO are prefetched, they must be processed by that consumer and where the transaction boundary has not yet completed, further prefetching will occur, perpetuating the cycle. For example, assume the system is processing messages in batches of 10 and prefetch is set to 15 messages. Depending on the logic for replenishment of the prefetch queue—the consumer will always receive more message either when the prefetch queue falls below a threshold or in the best case when it gets to 0. But since the transaction boundary will always be in the midst of a transaction—the prefetch queue will get replenished with the UOOs that are currently being processed. This will continue as long as that particular UOO is available.

In one implementation of the disclosed embodiments, an operational mode is provided where a queue may be defined/specified within the disclosed embodiments to be coupled with another queue of another messaging platform (any JMS transport provider) external thereto so as to facilitate communications between a directly connected consumer, producer or yet another messaging platform. In the case where the defined queue can only be read from by a consumer/client and not written to, it is referred to as a read proxy and in the case where the defined queue can only be written to by a producer/client, it is referred to as a write proxy. This may be similar to local and remote queues connected via a channel, as provided by the MQ platform. However, the disclosed embodiments advantageously provide:

1. The disclosed embodiments are able to take a provider, e.g., another messaging platform, such as a JMS based platform like MQ, queue and partition it into multiple lanes for multiple consumers designated by message groups. This allows message processing scalability and batch read, as described elsewhere herein.
2. Similarly, when the disclosed embodiments implement a write proxy, they are able to route messages to other provider queues based on message group mapping, i.e., in write proxy mode, the internal MOB thread can choose to write the message (which has just been read from a MOB namespace) to different provider queues based on metadata or content of each message, including the UOO or Message Group.
3. The proxy mode is persistent and hence lossless.
4. Proxy mode can help alleviate the concerns of network latency. For example, in the case where the other messaging platform/provider queue is far from the producer or consumer,—a nearby proxy provided by the disclosed embodiments may speed up processing by acting like a buffer, e.g. water tank, that can take/absorb variations in message supply or demand.

Generally, the disclosed MOB is capable of acting as a consumer/producer to another messaging platform, referred to as a provider, while working on one of its own namespaces so as to allow consumer and/or producers connected with those other providers to communicate with each other or with consumer or producers which are directly connected with the MOB. In contrast, in non-proxy mode, a producer must be directly connected with the MOB in order to communicate with a consumer, etc.

For example, as a read proxy, the disclosed MOB can interact with a provider on behalf of a consumer coupled with the MOB in order to read messages from a producer connected to the provider. As a write proxy, the disclosed MOB can interact with a provider on behalf of a producer coupled with the MOB in order to write messages to a consumer connected to the provider. As a bridge, the disclosed MOB can interact with multiple providers so as to read messages from a producer coupled with one provider and write those messages to a consumer coupled with another provider.

When a namespace is proxied/bridged to another provider as a read proxy, MOB just creates an internal thread that connects to the other provider and continuously, repeatedly reads messages from the specified queue hosted by other provider. Upon reading each message, it is written to the lanes in the namespace inside MOB just like a "producer" MOB client would do. Then, real MOB consumer clients can read the messages from MOB without connecting to the other provider. As a write proxy, MOB creates an internal thread that continuously, repeatedly, reads messages from the specified MOB namespace and writes to the specified queue hosted by another provider. As a bridge, MOB creates an internal thread that continuously, repeatedly: reads messages from the specified queue hosted by other provider and writes to the specified MOB namespace; and reads messages from the same specified MOB namespace and writes to the specified queue hosted by another provider.

Weblogic JMS supports read or write "proxying" to/from any JMS providers, through a feature called Messaging Bridge. However, Weblogic cannot add unit of order functionality as a read proxy to a non-Weblogic provider (it will only apply unit of order when both transports are Weblogic). In contrast, the disclosed embodiments support several non-JMS transports (e.g., Apache Kafka) and allows extension via program interface to other non-JMS messaging transports as well.

The proxy mode of the disclosed embodiments allows them to be deployed and Dynamic Lane support, described elsewhere herein, to be leveraged in a wider variety of ecosystems, connecting both business applications and middleware to each other with the same valuable features, i.e., proxy mode enables, from a consuming application perspective, the use of MOB features, like Dynamic Lane Support, with other messaging platforms. In particular, in combination with duplicate detection, described in more detail elsewhere herein, the disclosed embodiments are able to read from a source and store the messages locally with guaranteed no loss or duplicates without using 2 phase commit. That is, for messaging platforms which do not support duplicate detection, the disclosed proxy mode allows this function to be provided by proxying through MOB as described so that the consumer does not read any duplicates.

The disclosed proxy mode may further improve application and/or communication performance by abstracting, or otherwise decoupling, network distance, both physical and/or logical, from the producer and/or consumer. In particular, the disclosed embodiments' implementation of a proxy mode may allow for messages to be asynchronously transferred from a distant, relative to the consumer, source, wherein they may be provided to the consumer via a relatively shorter distance.

In one implementation, the disclosed embodiments, as described above, may be configured so as to transfer messages from one provider queue (source) to another provider queue (destination) losslessly, e.g., the internal MOB proxying thread is respecting transactions and MOB is persisting queued messages to the store as in normal operation, in a mode called "Bridge".

Generally, this is a combination of both the read and write proxy operations described above where the MOB is connected between two other messaging platforms/providers.

Bridged mode enables routing between, or the connection of, two different disparate messaging providers that don't support bridging themselves. Another common use case of bridging is to limit communication across networks or network segments.

For example, company Z's software connects only to Messaging Provider X in Z's internal datacenter, which the MOB may "bridge" to Messaging Provider Y at a service provider's datacenter. The service provider's software then only connects to Provider Y.

In this mode, a component implementation of the disclosed embodiments connects to both the source and destination provider queues using the provided implementations, and executes the following in an internal process: readers (a read process internal to the disclosed embodiments) read from a source (provider), i.e. a source transport (instance of a messaging provider or a collection of queues), and write to an internal namespace provided by the disclosed embodiments, and writers (a write process internal to the disclosed embodiments) read from the internal namespace and write to a destination (the destination provider), i.e. a destination transport.

While Apache ActiveMQ Artemis supports JMS Bridge functionality to move messages between any two remote JMS providers, the disclosed embodiments support several non-JMS transports and allows extension to other messaging transports as well. This allows the disclosed embodiments to be deployed in a wider variety of use cases.

The disclosed embodiments, using a client library (the MOB client archive/jar that is published to a central repository, and subsequently included in the software for systems that wish to read from or write messages to MOB and which defines the MOB Client API in java and includes all necessary client-side software to interact with any MOB server), via a CLIENT_SHARING_LIMIT configuration parameter set by a client application, either a consumer and/or producer, when initializing the client-side framework to interact with MOB, allows the client application to automatically conserve its resources (and indirectly, the corresponding server side resources) by sharing a single connection with the disclosed embodiments, including network resources, among multiple processing threads up to the specified limit. A connection is a single RPC relationship (Remote Procedure Call) with a number of resources that are allocated for the lifetime of the relationship. These resources include threads on both client and server side as well as 1 or more TCP socket connections. Even when idle, these allocated resources can constrain others, so maximizing utilization of each connection can result in higher capacity with the same overall resources. On the other hand, after a certain level of utilization, the performance of a single "connection" as measured by throughput and latency may degrade as calling threads increasingly compete for the same allocated resources.

Other than configuring the CLIENT_SHARING_LIMIT, a client application need take no action to benefit from this feature; the client library of the disclosed embodiments automatically manages the creation and destruction of the underlying connection(s) as needed.

When the CLIENT_SHARING_LIMIT is set to zero, each processing thread of a given consumer will have its own connection. Where, for example, The CLIENT_SHARING_LIMIT is set to three, the first three threads will share a single connection, and the next three threads will share another connection, etc. If the CLIENT_SHARING_LIMIT is set to less than zero, or alternatively, left undefined, no limit on the number of threads which share a connection will be imposed, i.e., only one connection will be provided for all of the processing threads.

All transport providers have a concept of sessions which are used to segregate transactions across TCP connections. In the Java world this concept manifests itself as a JMS session and a JMS connection that often have to be pooled and re-used for efficiency. J2EE containers are responsible for such activities. In contrast, the disclosed embodiments implicitly handle connection and session scaling up and down and remove the need for clients to run in a heavyweight J2EE container, i.e., a server platform for running a J2EE application, or integrate with third party libraries to efficiently manage resources.

In one implementation, the disclosed embodiments provide read and write limiting features to allow messages to be backed up upstream. In message processing pipelines or streams (really just a set of systems communicating in sequence), any single component is at risk of having its capacity exceeded or "overrun" by systems upstream. Exceeding capacity can eventually lead to errors that cause a running software instance to stop (e.g., an Out of Memory Error) and a involve a longer, more complex process of recovery. Back pressure, e.g., a feedback mechanism to alert the upstream system of diminished capacity, at the expense of degraded or slower overall processing time, allows a system to shift some of the burden of the exceeded capacities to upstream systems (where the additional load is coming from) with greater capacity to hold the excess load. While back pressure may be undesirable for sustained exceeded capacity, i.e., it is indicative of the set of systems does not have the capacity to process the desired load at the desired rate, it is especially useful to handle bursts of higher than expected load from upstream systems without invasive failures.

Accordingly, allowing messages to be backed up upstream is useful to keep the disclosed embodiments running well within resource limits, i.e., available/allocated memory and/or disk space, of the Java Virtual Machine (JVM) and computer on which it is executing. Unlike other platforms where it is possible to run out of memory, e.g. WebLogic would simply run out of memory and crash, or disk space, the disclosed embodiments can be configured to honor a resource constraint like a limitation of memory or disk space consumption. In one embodiment, disk space consumption is managed automatically by using a self-truncating journal which automatically truncates the data stored therein to fit in a defined allocation of space. When a resource constraint is specified by an administrator of the MOB, the disclosed embodiments will slow down writers/producers writing messages to it—if the available resource capacity falls blow a threshold value, e.g., the largest value of some measurement of a computer resource below which operation of MOB can be considered normal and unconstrained. In one embodiment, a namespace configuration parameter may be provided, e.g. MAX_MESSAGES, which defines the maximum queue depth for that namespace.

For example, if the namespace referenced in a particular write request has a current depth that exceeds a configured MAX_MESSAGES, then the disclosed embodiments will softly "Rate Limit" the producer by delaying each request to write a message, necessarily forcing the producer to wait/slow down the rate at which it can write messages. Read requests will be unimpacted, allowing the consumer to "catch up" to the producer. This delay may be implemented by causing the thread executing the "write" request in MOB to repeatedly: 1. stop all execution for a configured amount of time (say 100 milliseconds) where 2. if the current depth is now below threshold <OR> if the maximum delay (e.g., 30 seconds) has elapsed from starting this set of repetitions, then continue processing. Otherwise, go back to step 1 above.

Weblogic JMS provides a "Flow control" function which slows down producers based on a configured threshold range, and can be specified and enforced at multiple levels of granularity. In contrast, the disclosed embodiments enforce rate limiting at the namespace level and do not allow a single misbehaved namespace to rate limit other namespaces on the same server.

When a single application is consuming from an overloaded source and writing to a destination hosted on the same transport as part of the transaction, rate limiting the entire transport can cause a vicious cycle: high depth can never decrease because the consumer is too slow, but the consumer cannot speed up because its "produce" action to another destination is being rate limited due to the high depth. The disclosed embodiments avoid this problems by rate limiting only specific namespaces as opposed to the entire transport.

In order to guard against ungraceful errors on the server on which the disclosed MOB is executing such as running out of available memory, one implementation of the disclosed embodiments implements a threshold available memory, e.g., Java Virtual Machine heap, limit. Once the disclosed embodiments have has utilized, for example, 80% of available memory of the server computer on which the disclosed embodiments are operating, subsequent "write" requests to any queue will be prevented, returning an exception to the producer. This may be referred to as an upper threshold/bound/limit or high water mark. Read operations will be unimpacted, allowing utilization to decrease. Once memory utilization falls below, for example, 70%, write requests will be permitted to proceed. This may be referred to as a lower threshold/bound/limit or low water mark. In other embodiments, it may be determined when utilization is trending towards the upper threshold, even if the threshold has not been met, and trigger write restrictions based thereon. The upper and lower thresholds may be configurable. In one embodiment, high priority queues may be designated so as to exempt them from being impacted. This may be addressed using read and/or write rate limiting described above.

Weblogic JMS does allow a "quota" for messages to be specified in either count or memory usage, but it may not take into account other memory allocation in the configured process. After the quota is exceeded, exceptions will be returned to clients attempting to write. Weblogic indirectly, allows paging to be configured to move data out of volatile random-access memory to the operating system's file system storage. IBM MQ allows a "Maximum queue depth" to be configured, after reaching which will return errors to producers. IBM MQ also directly manages volatile memory buffers for recent messages and pages to the operating system's file system when exceeded.

In contrast, the disclosed embodiments directly monitor remaining available volatile memory at a process level and return API-level errors to producers when a threshold is reached. The disclosed embodiments are able to reap the benefits of on-heap dynamic memory allocation in its JVM while also ensuring relatively graceful service, e.g., consumption can continue and producers can remain connected, during high depth workloads. In particular, while not without costs, which include diminished locality of reference and less efficient overall memory utilization, the benefits of using the JVM's dynamic/automatic memory allocation and garbage collection instead of the alternatives (a manual memory management language/runtime or off-heap manual memory management in the jvm) include maintainability and ease of development, avoidance of certain memory related classes of bugs, and the ability to optimize performance of allocation and deleting objects under most common workloads. The disclosed embodiments also avoid the performance degradation associated with filesystem paging.

Typical messaging platforms allow for a read transaction which specifies a timeout parameter where, if the queue has no available messages with which to satisfy the read request, the client/consumer will wait for the specified timeout period. However, more often than not this function is implemented as a periodic poll for messages in the queue, i.e. during the waiting period, the consumers are polling, i.e. periodically interrogating/querying, the queue to see if a message is available, hence idle waiters put a constant load on the server. This itself is not bad but it causes CPU usage (waste of energy) when idle as well network usage.

In at least one implementation, the disclosed embodiments do not poll. If a read transaction with a specified timeout period is a received and a message is not available in the queue at that time, the disclosed embodiments will automatically register the client for a callback and notify the client to poll for a message only when a message becomes available, e.g. immediately there upon. The client then goes into a waiting state, e.g. for up to the duration of the timeout period, referring to the implementation using Java's Object #wait(timeout) method for the client JVM thread to stop its own execution until one of the following occurs: the period of time specified as the timeout has elapsed; or the server pushes or "calls back" the client JVM, which invokes the objects notify method. In this way, a single "push" takes the place of multiple repeated "poll" operations. When the call back is received by the client, the client ceases waiting and initiates a read transaction to obtain the available message. In one embodiment, the client may still implement a timeout period and if the call back is sent before, but received after, the timeout period expires, the call back is accepted so as to mitigate any network latency in the transmission of the call back message. Alternatively, the client ignores a late call back regardless of when sent.

Other platforms ignore optimization under "unsaturated" consumer load (i.e. periods, however brief, of "no messages available" for consumption) so as to focus instead on optimizations for "saturated" load conditions.

When a message processing engine reads message from a source, processes that message, and writes resulting messages to another destination, the only way one can effectively do "guaranteed once only processing with no message duplicates" is using a 2 phase commit (2 PC) protocol. The problem with 2 PC is that, as discussed elsewhere herein, it requires a transaction coordinator for arbitration. 2 PC problems are also notoriously hard to diagnose.

To be able to have guaranteed once only processing using a 1 phase commit (1 PC), the processing application can incorporate a duplicate check when a message is read as a possible duplicate but there is really no way to ensure that the destination queue, to which messages have been written to, will not have duplicates. For example, since the consumer is typically writing information to a database, the database can be queried prior to processing a message in order to skip/reject duplicate messages.

Consider the following sequence of a message processing system:
Read→Process→Write→Commit "Write"→Commit "Process"→Commit "Read"→Read (Next)

Which is the primary "processing loop" applications perform using the MOB, i.e., a sequence of instructions that is repeated by each consumer thread interacting with the Message Processing system. Each consumer thread in this system is also a producer. A very simple example would be that the system "reads" a request, "processes" by updating some state in its own database, and "produces" corresponding responses before moving on to read the next request if any available. The read, process, and write operations are each interactions with transactional resources (e.g., Inbound Queue 1, Database, Outbound Queue). For 1PC, the commit is a distinct "commit" operation in the client API of each transactional resource, typically communicated over a network using a specific client protocol. If the batch size in the read operation is greater than one, e.g., using batch read described above, then multiple messages will be read and as many as are available will be returned. Any lanes already included in the transaction will be included/exhausted first, followed by messages from any additional available lanes.

If, after the "write" action has been committed, a failure occurs while committing the "process" action, then the "read" action, not yet having been committed, will be rolled back as well even though the write of result message has been completed. E.g.:

Read→Process→Write→Commit "Write"→Commit "Process" [ERROR]→Rollback "Process"→Rollback "Read"→Read (Next)

The commit acts on the current batch as well as any other interactions that may have occurred with the transaction resource within the duration current transaction. However, though it's not covered here, Message Processing Systems may choose to handle the processing of this batch of consumed messages differently depending on needs. In the simplest, all-or-none approach, all 3 resources operate on the entire batch, i.e., the read commit includes all messages and lanes in the batch, and the process commit includes all database work for each message in the batch, and the write commit includes all resulting messages from the batch Thus, the same message will be read again (by the next Read), with no intrinsic system state to detect a duplicate. A second resulting message will be written to the destination for this same inbound message, representing a duplicate to the downstream consumer.

To prevent this from happening, the disclosed embodiments can be used as the destination transport (target for "write") and can be configured to detect and discard the duplicate 2nd attempt to "write" the same message. In particular, the sequence with respect to a consumer thread in the Message Processing System would be:

Read→Process→Write #2→Commit "Write" #2 (duplicate check)→Commit "Process"→Commit "Read"→Read Next This is the second time the same message is going through the same loop, i.e., a retry after the read was rolled-back after the above database write commit failure (Since Read and Process were not committed, this doesn't count as Read #2 or Process #2). Since none of the database work was committed on the first attempt, the message processing system cannot detect a duplicate itself and correctly updates the database during processing and writes the response message to the destination queue. If the destination queue does not detect and ignore this message as a duplicate, then any downstream message system will receive duplicate responses from a single request message.

Figure 3:
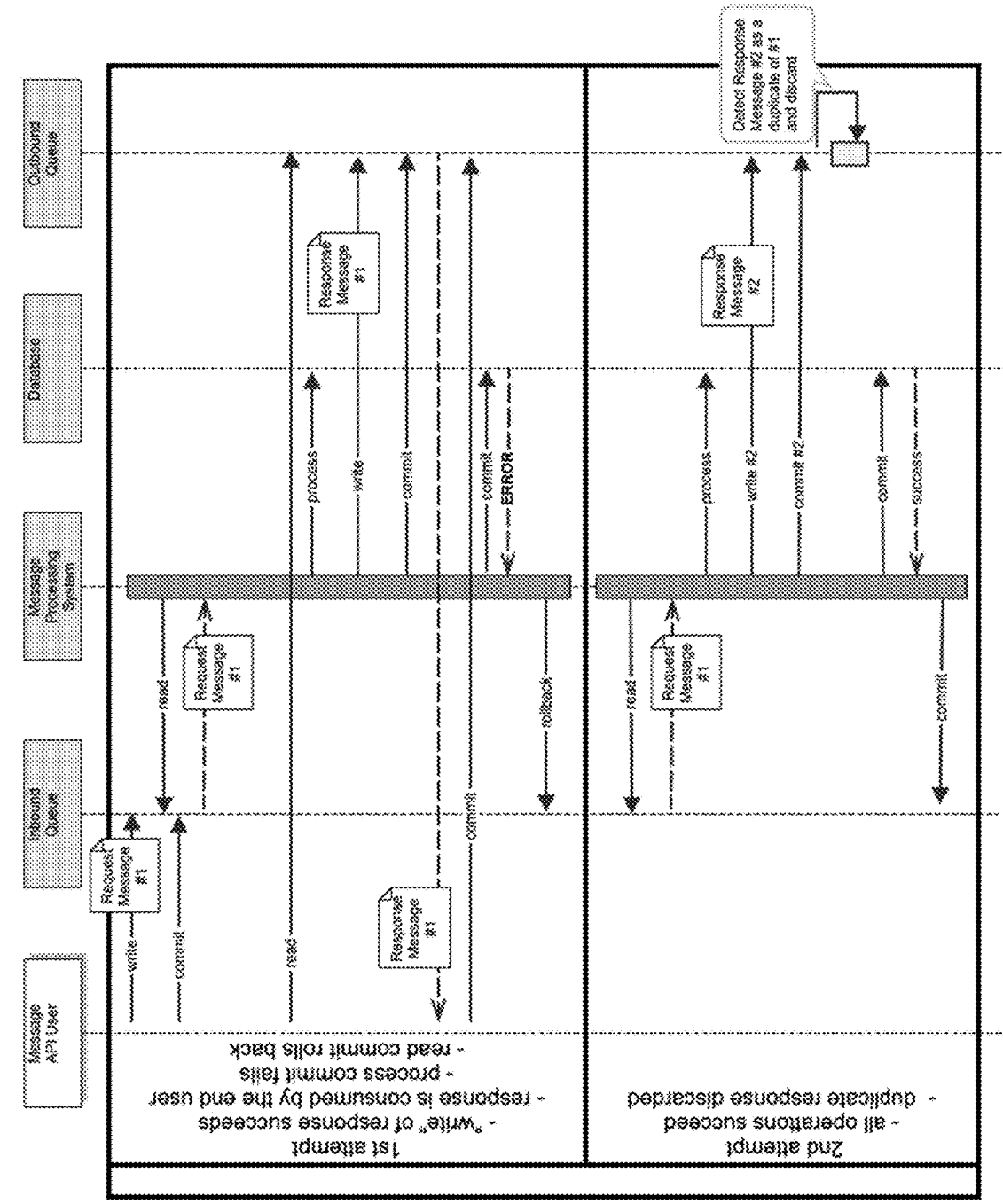
FIG. 3 depicts a simple interaction of a Firm requesting an updated trade from the FEC.

With FEC as the example "Message Processing System" and a Clearing Firm being the "User", a simple interaction would be the Firm requesting that a Trade be updated, and FEC updating the trade in the database and producing a new message to be routed to the firm affirming that the specific trade has been updated with the desired value. See the example, shown in FIG. 3

For time based duplicate detection, the disclosed embodiments configurably allow for ignoring duplicate messages, as defined by having an equivalent value for a particular header or, alternatively, by having an equivalent message checksum to another message in the same namespace within a time boundary relative to the commit of a newly written message to another message that has been written to the same namespace and committed no earlier than the configured amount of time prior to the time of the current commit. Other criteria for identifying duplicate messages may also be used.

For example, where namespace a.b.c is configured with time based duplicate detection to look for header with key "UNIQUE_BUSINESS_ID" and time limit 1 hour:

At 9:05 am, Message #1 is written to namespace a.b.c with UNIQUE_BUSINESS_ID header value of "A0001", and committed;

MOB makes the message available for consuming users to read;

At 10:04 am, Message #2 is written to namespace a.b.c with UNIQUE_BUSINESS_ID header value of "A0001"; and MOB discards Message #2 as a duplicate, and does not make the message available for reading.

Amazon SQS enables silent duplicate detection of either message content or a special metadata attribute within a predefined 5-minute interval. However, this unchangeable 5-minute interval may not be sufficient in many client recovery scenarios that involve long running transactions or heavy processing loads. In contrast, the disclosed embodiments allow the time interval to be configured on a per-namespace basis.

In addition to detecting duplicates within a temporal boundary as discussed elsewhere herein, the disclosed embodiments support ignoring messages duplicated in a relative "quantity of messages" boundary, referring to this as "History Based" dupe detection. The set of messages to be considered is bounded by a maximum count of the most recently written (and committed) messages prior to the newly written message that is being considered for commit. As in Time Based Duplicate Detection, a duplicate is defined by having an equivalent value for a particular header or, in an alternative configuration, by having an equivalent message checksum to another message in the same namespace within the applicable set.

Generally, the duplicate detection provided by the disclosed embodiments, in lieu of using a two phase commit protocol, operates on two levels, one at the processing code level using the redelivery flag and the other in the write queue by hashing the message.

Consider the following PC model:
Read=-1 PC
DB/Processing=1 PC
Write=0 PC
The order of commit being write, process, read (opposite of the loop order of operations).

If the above sequence is not completed, the message is redelivered with redelivery flag set to ON for the message, putting the processing loop into exception processing. Program code will check to see if the message processing was completed by checking the database and re-process the message if not completed. Resulting messages will be written out, i.e., outbound namespace will have a duplicate detection (by history limited by number of messages or time) that will ensure that the possible duplicate messages are not written out Apache ActiveMQ, within a configurable cache size, enables "disruptive" duplicate detection based on a special metadata attribute. By "disruptive" (as opposed to "silent"), it is meant that the entire transaction containing the duplicate message will result in an error upon commit. Accordingly, Apache ActiveMQ causes the entire write transaction to fail if a duplicate message is detected. In contrast, the disclosed embodiments allow the transaction containing the write to succeed. The disclosed embodiments then seamlessly prevent the duplicate message from being added to a lane for delivery to a consumer. It may be important during many system failover/recovery idioms to not cause transactions to fail just because a duplicate has been detected.

In addition, Apache ActiveMQ does not allow duplicate detection based on message content. However, content based duplicate detection, as implemented by the disclosed embodiments, is valuable in situations where producer components cannot easily populate a unique metadata attribute at the appropriate level of abstraction.

The management and conveyance of electronic messages between computer processing elements, such as processing threads, clients, server, etc., via a computer network or via inter-process communication, is a technical implementation and problems therewith, such as excessive latency, excessive memory consumption, bottlenecks, inefficient operation/use of resources, duplicate message delivery, contention between processes for messages resulting in process starvation, indeterminate operation/out-of-order delivery, etc., are technical problems which can affect computer processes and systems which rely on electronic message based communication for operation. As such, the disclosed embodiments provide technical solutions to these technical problems.

The disclosed embodiments provide an improved messaging platform which an improved queue data structure and improved management and control mechanisms for the communication of electronic messages and therefore provide a specific and practical application which improves upon prior messaging platforms and provides additional functionality not previously provided.

The disclosed embodiments solve problems which uniquely arise in the fields of computer technology and electronic communication. This the disclosed embodiments are rooted in computer technology in order to overcome problems specifically arising in computer systems and inter-process communications. Indeed, the subject technology improves the functioning of the computer by, for example, minimizing latency, mitigating memory consumption, eliminating bottlenecks, improving efficiency of operation/use of resources, preventing duplicate message delivery, eliminating contention between processes for messages resulting in process starvation, and providing determinate operation/ordered delivery.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house may implement the FEC system described above utilizing the disclosed embodiments in concert with the above described Clearing Message Broker.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of exchanging clearing related messages. The disclosed embodiments may also be used by other components to facilitate internal or external inter- or intra-process communication.

Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature, such as clearing firm or clearing entity, reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods, including the functions of the clearing house described above, is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
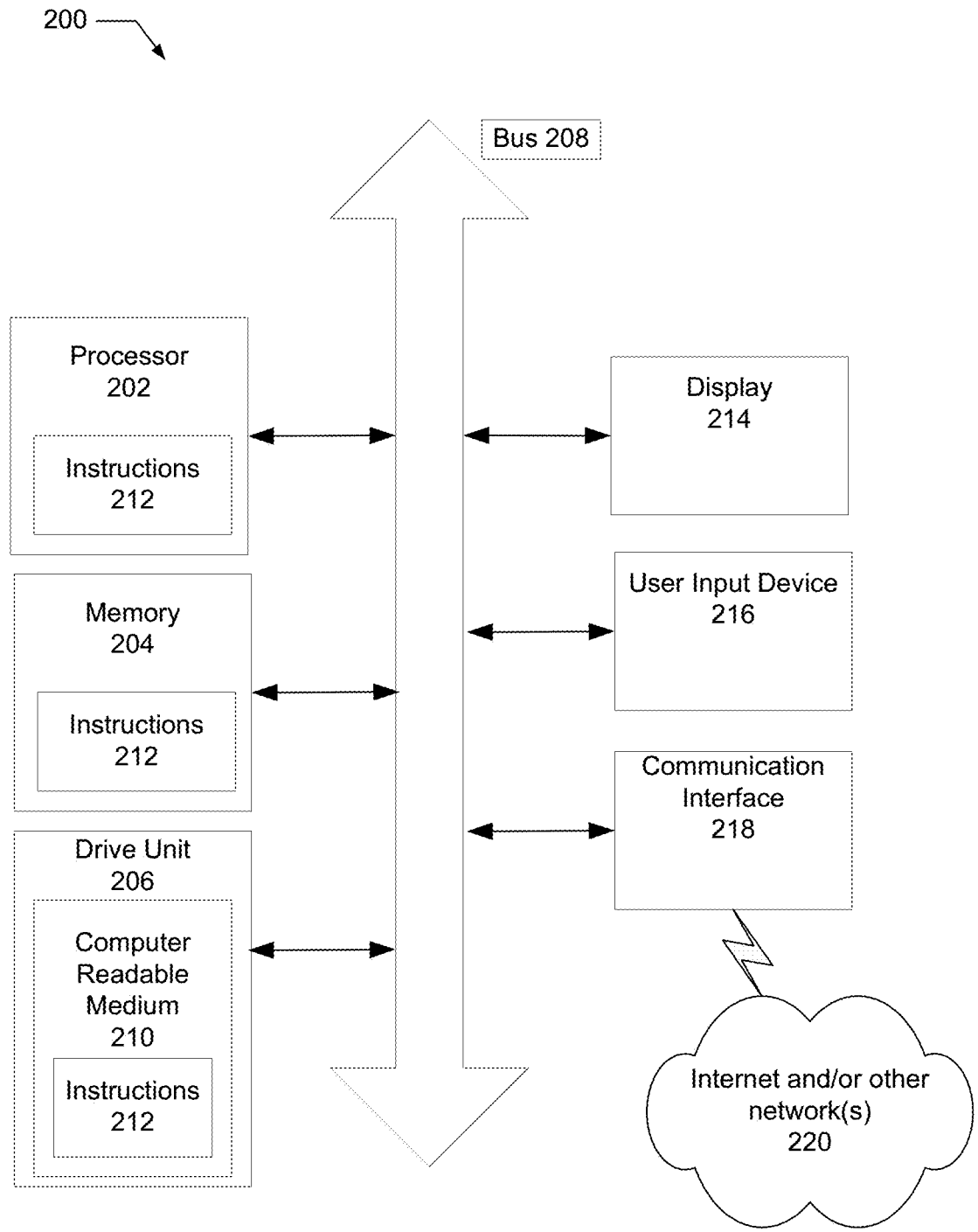
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A messaging module 122, shown in more detail in FIG. 4 described in more detail below, may be included to, using the disclosed embodiments, implement, facilitate and manage both inter- and intra-module messaging/communication, e.g., among those modules which implement the clearing functions, as well as with other modules or components of the exchange computer system 100 and with external components/entities, such as clearing firm computer systems, as described herein.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade, clearing or other information therewith, such as by using messaging via the messaging module 122. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Messaging Module

Figure 4:
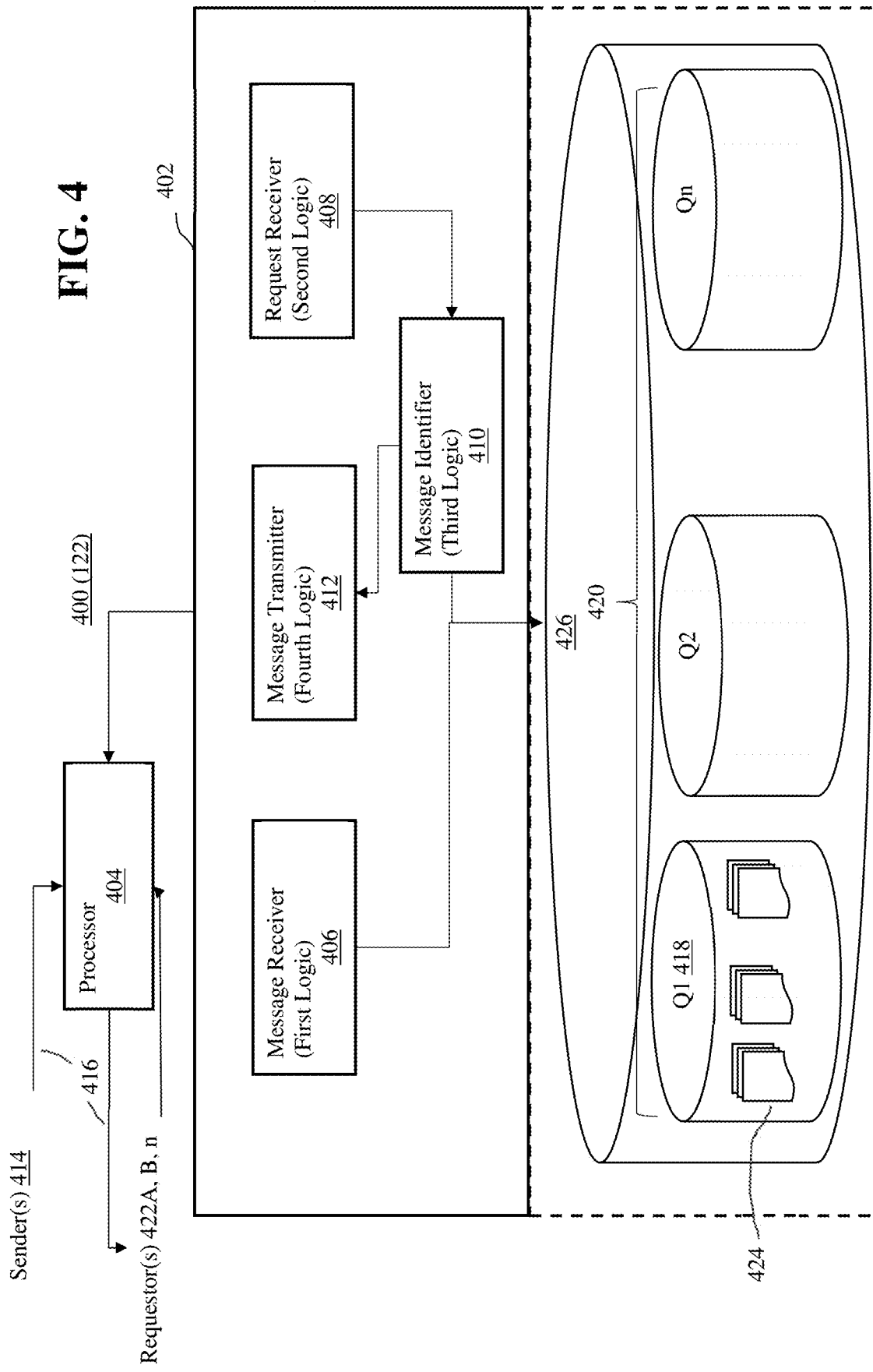
FIG. 4 depicts a block diagram of a messaging module, according to some embodiments.

FIG. 4 depicts a more detailed block diagram of the messaging module 122 of FIG. 1 illustrating a system 400, also referred to as a component, intermediary, platform, transport or architecture, which may be implemented as a separate component or as one or more logic components, such as part of one more of the modules of the exchange computing system 100 described above, such as on an FPGA that may include a memory or reconfigurable component to store logic and processing component to execute the stored logic, or as computer program logic, stored in a memory 402, or other non-transitory computer readable medium, and executable by a processor 404, such as the processor 202 and memory 204 described above with respect to FIG. 2. The system 400, generally, communicates or otherwise facilitates communication of electronic messages from one or more sources, senders, publishers or producers 414 to one or more destinations, recipients, subscribers or consumers 422, which may be operating/executing on the same or different physical computer systems, via an inter-process communications medium, such as a shared memory, bus or channel, and/or electronic communications network 416. It will be appreciated that a given entity may be both a sender/producer of messages as well as receiver/consumer of messages, which may be their own or from others, and the terms sender, producer and the like and receiver, consumer and the like may refer to a given entity performing a particular function which defines their role as a sender/producer and/or recipient/consumer with respect to the present operation of the disclosed embodiments. Furthermore, a given entity may comprise one or more senders/producers and/or recipients/ consumers, e.g., for a multi-threaded process, each process may be sender/producer and/or recipient/consumer.

The system 400 includes a message receiver 406, which may be implemented as first logic or other computer executable program code 406 stored in the memory 402 and configured to be executed by the processor 404, or otherwise operative to receive, from a sender 414, of a plurality of senders, electronically coupled 416 therewith, one or more electronic messages comprising data indicative of a queue data structure 418 of a plurality of queue data structures 420, stored in a memory 426 (which may be the same as or different from the memory 402) coupled with the message receiver 406, in which the electronic message(s) should be stored to await transmission to a requestor 422 and whether the electronic message(s) is/are related to another one or more previously received electronic message(s), the message receiver being further operative to store, automatically, the received electronic message(s) in the specified queue data structure 418 grouped 424 together with any related previously received electronic messages which have not yet been transmitted to a requestor 422. In one embodiment, the message receiver 406 may comprise a hardware and/or software interface or application program interface ("API").

As noted above, the sender 414 may be coupled, or otherwise communicate, with the message receiver 406 via an electronic communication network, an inter- or intra-process communication medium or other means of electronic communication 416 between operating computer programs which is coupled between the sender 414 and the processor 404. The sender 414 and the system 400 may be executing on the same or different physical computers/computer processors. In one embodiment, the system 400 may operate in a proxy mode, as described above, whereby a sender 414 may comprise a different messaging platform/architecture to which other senders (not shown) are coupled and wish to communicate electronic messages to the requestors 422 coupled with the system 400 via the other messaging platform.

The electronic message(s) received from the sender 414 may comprise data, e.g., a data message, destined for a recipient 422 to be stored in the queue data structure 418. The queue data structure 418 in which to store the data may be identified explicitly, e.g., using a unique namespace or other identifier as described above, or implicitly via the content of the electronic message, e.g., using content based routing, as was described above. In addition, the sender 414 may indicate, e.g., the electronic message(s) may include data which specifies, that the electronic message is related to other electronic messages, previously, or to be subsequently, sent to the system 400, such as by specifying sequence, ordering or other relationship, such as a subject matter relationship, therebetween. In one embodiment, the specified sequence/ordering defines the sequence or order in which a single requestor 422, e.g., a process thread, should read and process the related electronic messages, e.g., so as to ensure transactional determinism. Such related messages may be referred to as a unit of order ("UOO") as was described above. As will be described, the electronic message may be related to a write transaction, as described above, undertaken by the sender 414 to write/publish/store, using one or more transfers/operations/interactions, one or more electronic messages to the one or more of the plurality of queue data structures 420 for communication to one or more requestors 422.

A queue data structure 418 may be created or implemented automatically by the system 400 upon request, either explicit or implicit, of a sender 414 and/or requestor 422. Alternatively, senders 414 and/or requestors 422 may register with the system 400 and request a queue data structure 418 be created upon configuration, initialization or startup of the system 400. Senders 414 may further request removal of a queue data structure 418, such as when no longer needed. As noted above, each of the plurality of queue data structures 420 may be uniquely identifiable, such as based on a namespace or other identifier, or based on a particular content or subject matter.

Each queue data structure 418 of the plurality of queue data structures 420 may operate non-concurrently or otherwise asynchronously with respect to another queue data structure 418 of the plurality of queue data structures 420 to allow reading and/or writing of messages.

As noted above, electronic messages, which are indicated to be related to each other, may be stored in the queue data structure 418 grouped together 424 and segregated from other groups 424 of related electronic messages stored in the queue data structure 418. These groups 424 may be logically segregated, e.g., they may comprise sub-queue data structures and may be referred to as "lanes." A lane 424 may be dynamically created when an electronic message, unrelated to another electronic message already stored in the queue data structure 418, is received. Alternatively, lanes 424 may be created by senders 414 or by requestors 422, e.g., when they register to send or receive messages, etc. Similarly, lanes 424 may be persistent or, alternatively, may be destroyed/removed when empty.

In one embodiment, a queue data structure 418 may store only one group of related electronic messages 424 at any one time, i.e., a single lane, which may be referred to as an "exclusive mode." Alternatively, the queue data structure 418 may store multiple groups of related electronic messages 424 at any one time, i.e., multiple lanes, referred to as a "hybrid mode."

The system 400 further includes a request receiver 408, which may be implemented as second logic or other computer executable program code 408 stored in the memory 402 and configured to be executed by the processor 404, or otherwise operative to receive one or more requests from a requestor 422A for transmission thereto of an electronic message from the queue data structure 418, the request(s) being related to a read transaction by the requestor 418 of one or more electronic messages from the queue data structure 418.

As noted above, the requestors 422 may be coupled, or otherwise communicate, with the request receiver 408 via an electronic communication network, an inter- or intra-process communication medium or other means of electronic communication 416 between operating computer programs which is coupled between the requestors 422 and the processor 404. The requestors 422 and the system 400 may be executing on the same or different physical computers/computer processors. A requestor 422A may comprise a process thread. In one embodiment, the requestor 422A is one of a plurality of requestors 422, the request for transmission of an electronic message is received via a logical connection, the logical connection being shared by the plurality of requestors 422, which may be referred to as connection scaling described above. In one embodiment, the system 400 may operate in a proxy mode, as described above, whereby a requestor 422A may comprise a different messaging platform/architecture from which other requestors (not shown) are coupled and wish to obtain/read electronic messages from the senders 414 coupled with the system 400 via the other messaging platform.

Requestors 422 may register/subscribe with the system 400 to receive electronic messages from particular queue data structures 418, e.g., to receive electronic messages from particular senders/publishers 414. A request may identify from which queue data structure 418 to read. The request(s) may be related to a read transaction undertaken by the requestor 422A to read one or more electronic messages from one or more of the queue data structures via one or more operations, transfers, interactions, etc., as was described above. As further described herein, once initiated, a transaction must be completed by the requestor 422A, e.g., by sending a commit or roll-back operation to the system 400.

The system 400 further includes a message identifier coupled with the request receiver 408 and the memory 426 and which may be implemented as third logic or other computer executable program code 410 stored in the memory 402 and configured to be executed by the processor 404, or otherwise operative to automatically identify, responsive to the request(s), an electronic message stored in the queue data structure 418 for which another requestor 422B has not previously received another electronic message related thereto responsive to a request from the other requestor 422B which is related to another read transaction from the queue data structure 418 that has not yet been completed by the other requestor 422B, e.g., for which a commit or roll-back operation has not been received.

As was described above, lanes, i.e., groups 424 of related electronic messages, are, in one embodiment, bound a particular requestor/consumer 422 for the duration of that requestor's 422 read transaction, e.g., until that requestor 422 indicates a commit or a roll-back to the system 400. This means that the requestor 422 has exclusive access to that lane/group of related electronic messages 424 for as long as it wants/needs, etc., e.g., the requestor/consumer 422 controls the duration over which it has exclusive access to the lane 424. This enables UOO operation whereby the system 400 isolates/segregates related messages, e.g., within a given namespace or queue data structure 418, and can ensure that one requestor 422A can read all of a related/ordered group of electronic messages without another requestor/consumer 422B intervening, while ensuring that the lane 424 is released by the requestor/consumer 422A once they have completed their transaction so that other requestors/consumer may read from it. This minimizes any one requestor/consumer 422 from tying up resources, maximizes resource, e.g., queue, utilization, and prevents starvation of requestors 422, while ensuring UOO operation.

In particular, the message identifier 410 identifies an electronic message stored in the queue data structure 418 from a lane 424 which is not currently bound to another requestor 422B, i.e., for which another requestor 422B has not previously received another electronic message related thereto responsive to a request from the other requestor 422B which is related to another read transaction from the queue data structure 418 that has not yet been completed by the other requestor 422B, e.g., for which a commit or roll-back operation has not been received. The identified electronic message may be from a lane 424 which is currently bound to the requestor 422A from which the request was received, i.e., the identified electronic message may be related to an electronic message previously sent to the requestor 422A where the requestor 422A has yet to complete its read transaction. Alternatively, such as where the requestor 422A has initiated a new read transaction, the identified electronic message may be from a new available lane 424.

As was noted above, a given queue data structure 418 may be limited to a single lane 424, e.g., operating in an exclusive mode, which if currently bound to another requestor 422B, would result in the message identifier 410 being unable to identify an available electronic message responsive to the request. Alternatively, the queue data structure 418 may provide for multiple lanes 424 as was described, where each may be bound to a particular requestor 422.

In an alternative embodiment, the message identifier 410 may simply identify any available electronic message responsive to the request regardless of it relation to other electronic messages presently stored in the queue data structure or previously transmitted to another requestor 422B which has yet to complete its read transaction. This may be referred to as a non-exclusive mode of operation.

The system 400 further includes a message transmitter 412 coupled with the message identifier 410 and which may be implemented as fourth logic or other computer executable program code 412 stored in the memory 402 and configured to be executed by the processor 404, or otherwise operative to automatically transmit the identified electronic message to the requestor 422A, e.g., via the inter- or intra-process communication medium and/or electronic communications network 416, wherein the message identifier 410 is further operative to prevent transmission of an electronic message, related to the identified electronic message, to another requestor 422, until the requestor 422A indicates that its read transaction has been completed, e.g., committed or rolled-back. That is, the system 400 binds the particular lane 424 to the requestor 422A until the requestor completes its transaction.

The system 400 may be implemented as one or more separate components or as one or more logic components, e.g. first through fourth logic 406-412, such as on an FPGA that may include a memory or reconfigurable component to store logic and processing component to execute the stored logic, or as computer program logic, stored in the memory 402, or other non-transitory computer readable medium, and executable by a processor 404, such as the processor 202 and memory 204 described below with respect to FIG. 2, to cause the processor 404 to, or otherwise be operative to, implement the above described operations.

As described, the system 400 implements a routing function to route messages from a sender 414 to a requestor 422A by automatically storing electronic messages received from a given sender in a particular queue data structure 418 from which a requestor 422A, desiring to receive those messages, issues read transactions.

In one embodiment, the system 400 may implement a batch read function as was described above. In particular, the request may further comprise a specification of a number of messages to be read by the requestor 422A, the message identifier 410 being further operative to identify as many of the specified number of messages as are stored in the queue data structure 418 for which another requestor 422B has not previously received another electronic message related thereto responsive to a request from the other requestor 422B which is related to another read transaction from the queue data structure 418 that has not yet been completed by the other requestor 422B, the message transmitter 412 being further operative to transmit the identified messages to the requestor 422A. The message identifier 410 may identify available messages within the lane 424 bound to the requestor 422A as well as available additional messages from other unbound lanes 424 as needed to fulfill the request as much as possible, i.e., until the available messages have been exhausted.

In one embodiment, once identified and transmitted to a requestor 422A, i.e., the requestor 422A has acknowledged receipt, the identified electronic message may be removed from the queue data structure 418. Alternatively, read electronic messages may be persisted in the queue data structure 418. In one embodiment, an unread electronic message stored in the queue data structure may be stored indefinitely. Alternatively, stored electronic messages may be removed if not read by a requestor within a defined time period, e.g., a time to live parameter measured from the time the electronic message was stored.

In one embodiment, a request for transmission of an electronic message includes the confirmation of receipt for a previously transmitted electronic message, which may be referred to as an implicit commit as described above.

In one embodiment, the system 400 may implement rate limiting, as described above, by determining, such as by the message receiver 406, whether a number of electronic messages currently stored in the queue data structure 418 exceeds a threshold and based thereon preventing a sender 414 from sending another electronic message for storage in the queue data structure 418, while continuing to allow read operations. The threshold may act as a rate limiter to control the number of queued electronic messages at any given time.

In one embodiment, the system 400 may implement memory management, as described above, by determining, such as by the message receiver 406, whether an available capacity of the memory 426 exceeds a first threshold and based thereon preventing a sender 414 from sending another electronic message for storage in the queue data structure 418 until the available capacity of the memory 426 falls below a second threshold lower than the first threshold. That is, write/store operations will be paused while read operations are allowed to continue until the memory consumed by the queue data structures 420 falls below the defined threshold. This may protect the computer on which the system 400 is executing from running low on available memory.

In one embodiment, the system 400 may implement poll free read operation, as described above, wherein when the message identifier 410 is unable to identify any electronic messages for transmission to the requestor 422A responsive to the request, registering, by the processor 404, the requestor 422A to be subsequently contacted, e.g., receive a call back, when a suitable message is available prior to a specified elapse of time. Accordingly, the requestor 422 need not continually send requests to the system 400 when there are no messages available.

In one embodiment, the system 400 may prevent duplicate messages from being transmitted to a requestor 422. In particular, the message transmitter 412 may prevent retransmission of an electronic message to a requestor 422 that has confirmed receipt of that electronic message. In particular, if, after an electronic message has been transmitted to a requestor 422A, that requestor 422A indicates a roll-back, the message identifier 410 can determine if the next request from that requestor 422A will read the same message and, if so, ignore it. Duplicates may be identified based on two electronic messages having a same header value or two electronic messages having a same checksum value within the same queue data structure 418 or namespace within a time boundary relative to a commit of a newly written message or within a specified quantity of recently written messages. This may be referred to as time or history based duplicate detection as described above.

Figure 5:
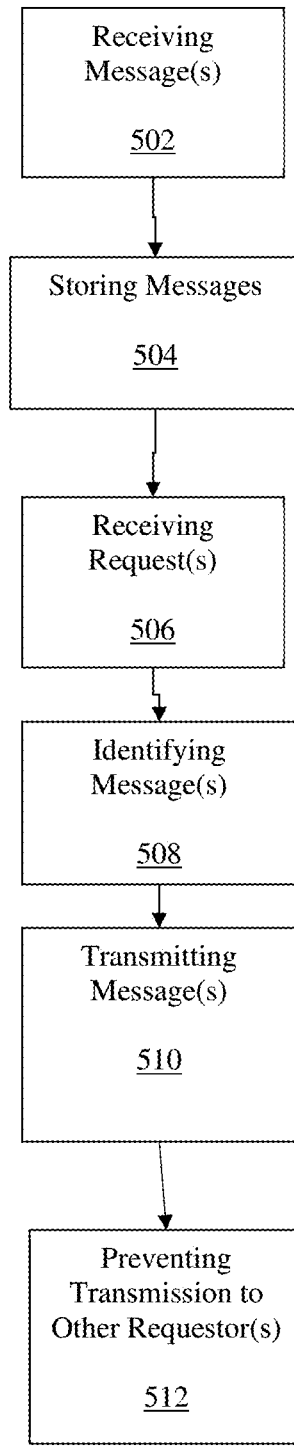
FIG. 5 illustrates an example flowchart showing example operation of the system of FIGS. 1-4.

FIG. 5 illustrates an example flowchart 500 of the operation of the system 400. In one embodiment, the operation of the system 400 includes: receiving, by a processor 404 from a sender 414 (publisher/producer), of a plurality of senders electronically coupled 416 therewith (via inter/intra process communication and/or a computer network), one or more electronic messages comprising data indicative of a queue data structure 418 of a plurality of queue data structures 420, stored in a memory 426 (402) coupled with the processor 404, in which the electronic message(s) should be stored to await transmission to a requestor 422 and whether the electronic message(s) is/are related to other previously received electronic messages (Block 502); storing (e.g., routing), by the processor 404, the received electronic message(s) in the queue data structure 418 grouped together 424, e.g. in a lane, with any related previously received electronic messages which have not yet been transmitted to a requestor 422 (Block 504); receiving, by the processor 404, one or more requests from a requestor 422A for transmission thereto of an electronic message from the queue data structure, the request(s) being related to a read transaction by the requestor 422A of one or more electronic messages from the queue data structure (Block 506); identifying, by the processor 404 responsive to the request(s), an electronic message (which may be related, e.g., form a currently bound lane, or not, to a previously transmitted message) stored in the queue data structure 418 not bound to another requestor 422B, e.g., for which another requestor 422B has not previously received another electronic message related thereto (available/unbound lane) responsive to a request from the other requestor 422B which is related to another read transaction from the queue data structure 418 that has not yet been completed by the other requestor 422B, i.e., committed or rolled-back (Block 508); transmitting, by the processor 404, the identified electronic message to the requestor 422A (Block 510); and preventing, by the processor 404, transmission of an electronic message, related to the identified electronic message, to another requestor 422B, until the requestor 422A indicates that its read transaction has been completed, e.g., committed or rolled-back (Block 512).

In one embodiment, the electronic message is received by processor 404 from the sender 414 via an electronic communications network 416 coupled therebetween.

In one embodiment, the request is received by the processor 404 from the requestor 422A and the identified electronic message is transmitted by the processor 404 to the requestor 422A via an electronic communications network 416 coupled therebetween.

In one embodiment, the requestor 422A comprises a processing thread.

In one embodiment, the received electronic message is related to another previously received electronic message based on a sequence in which those messages must be processed by a requestor 422A.

In one embodiment, the queue data structure 418 stores only one group of related electronic messages at any one time.

In one embodiment, the operation of the system 400 further includes receiving, by the processor 404, one of a commit operation or a rollback operation from the requestor 422A indicative of the requestor 422A having completed the read transaction.

In one embodiment, the operation of the system 400 further includes storing the received electronic message in a sub-queue 424, e.g. lane, of the queue data structure 418 created to store electronic messages related thereto and removed when empty.

In one embodiment, wherein the request comprises a specification of a number of messages to be read by the requestor 422A, the identifying further includes identifying, by the processor 404, as many of the specified number of messages as are stored in the queue data structure 418 for which another requestor 422B has not previously received another electronic message related thereto responsive to a request from the other requestor 422B which is related to another read transaction from the queue data structure 418 that has not yet been completed by the other requestor 422B, the transmitting further includes transmitting, by the processor 404, the identified messages to the requestor 422A.

In one embodiment, the operation of the system 400 further includes removing, by the processor 404, the identified electronic message from the queue data structure 418 upon receipt of a confirmation of receipt from the requestor 422A subsequent to the transmission, wherein the request for transmission of an electronic message includes the confirmation of receipt for a previously transmitted electronic message.

In one embodiment, the sender 414 comprises a messaging platform, the electronic message being received from another sender via the messaging platform.

In one embodiment, the requestor 422A comprises a messaging platform, the identified electronic message being transmitted to another requestor via the messaging platform.

In one embodiment, the requestor 422A is one of a plurality of requestors 422, the request for transmission of an electronic message is received via a logical connection, the logical connection being shared by the plurality of requestors 422.

In one embodiment, the operation of the system 400 further includes determining whether a number of electronic messages currently stored in the queue data structure 418 exceeds a threshold and based thereon preventing a sender 414 from sending another electronic message for storage in the queue data structure 418.

In one embodiment, the operation of the system 400 further includes determining whether an available capacity of the memory exceeds a first threshold and based thereon preventing a sender 414 from sending another electronic message for storage in the queue data structure 418 until the available capacity of the memory falls below a second threshold lower than the first threshold.

In one embodiment, the operation of the system 400 further includes, when the processor 404 is unable to identify any electronic messages for transmission to the requestor 422A responsive to the request, registering, by the processor 404, the requestor 422A to be subsequently contacted when a suitable message is available prior to a specified elapse of time.

In one embodiment, the operation of the system 400 further includes preventing retransmission of an electronic message to a requestor 422A that has confirmed receipt of that electronic message.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method including:
identifying, by a processor, selected content;
establishing, by the processor, a selected lane for the selected content by defining an exclusive mode contention protocol for access arbitration for requests to access the selected content via the selected lane;
receiving, by the processor, a first request from a first requestor and a second request from a second requestor;
binding, by the processor and responsive to the first request, the selected lane to the first requestor and directing transmission via the selected lane;
determining, by the processor and responsive to the second request, to deny access to the selected content by the second requestor at least until the first requestor is unbound from the selected lane;
unbinding, by the processor and after determining to deny access to the selected content by the second requestor, the first requestor from the selected lane in response to detection of a transaction completion; and
enforcing, by the processor, fairness within the exclusive mode contention protocol by providing access to the selected content to the second requestor before the first requestor after unbinding the first requestor from the selected lane.

2. The computer-implemented method of claim 1, wherein determining access to the selected content by the second requestor includes determining that the second request was received after the first requestor was already bound to the selected lane and regardless of the fairness within the exclusive mode contention protocol.

3. The computer-implemented method of claim 1, wherein establishing the selected lane further includes assigning a persistent network resource for transmission of the selected content over the selected lane.

4. The computer-implemented method of claim 1, wherein binding the selected lane includes assigning a dynamic network resource for transmission of the selected content over the selected lane.

5. The computer-implemented method of claim 1, wherein the selected content includes a group of messages from a single publisher.

6. Non-transitory machine-readable media configured to store instructions thereon, the instructions configured to, when executed, cause a processor to:
identify selected content;
establish a selected lane for the selected content by defining an exclusive mode contention protocol for access arbitration for requests to access the selected content via the selected lane;
receive a first request from a first requestor and a second request from a second requestor;
bind, responsive to the first request, the selected lane to the first requestor and direct transmission via the selected lane;
determine, responsive to the second request, to deny access to the selected content by the second requestor at least until the first requestor is unbound from the selected lane;
unbind, after determining to deny access to the selected content by the second requestor and in response to detection of a transaction completion, the first requestor from the selected lane; and
enforce fairness within the exclusive mode contention protocol by providing, access to the selected content to the second requestor before the first requestor after unbinding the first requestor from the selected lane.

7. The non-transitory machine-readable media of claim 6, wherein the instructions are further configured to determine access to the selected content by the second requestor by determining that the second request was received after the first requestor was already bound to the selected lane and regardless of the fairness within the exclusive mode contention protocol.

8. The non-transitory machine-readable media of claim 6, wherein the instructions are further configured to establish the selected lane further by assigning a persistent network resource for transmission of the selected content over the selected lane.

9. The non-transitory machine-readable media of claim 6, wherein the instructions are further configured to bind the selected lane by assigning a dynamic network resource for transmission of the selected content over the selected lane.

10. The non-transitory machine-readable media of claim 6, wherein the selected content includes a group of messages from a single publisher.

11. A system including:
memory; and
a processor configured to execute logic, stored on the memory, the logic configured to:
identify selected content;
establish a selected lane for the selected content by defining an exclusive mode contention protocol for access arbitration for requests to access the selected content via the selected lane;
receive a first request from a first requestor and a second request from a second requestor;
bind, responsive to the first request, the selected lane to the first requestor and direct transmission via the selected lane;
determine, responsive to the second request, to deny access to the selected content by the second requestor at least until the first requestor is unbound from the selected lane;
unbind, after determining to deny access to the selected content by the second requestor and in response to detection of a transaction completion, the first requestor from the selected lane; and
enforce fairness within the exclusive mode contention protocol by providing, access to the selected content to the second requestor before the first requestor after unbinding the first requestor from the selected lane.

12. The system of claim 11, wherein logic is further configured to cause the processor to determine access to the selected content by the second requestor by determining that the second request was received after the first requestor was already bound to the selected lane and regardless of the fairness within the exclusive mode contention protocol.

13. The system of claim 11, wherein logic is further configured to cause the processor to establish the selected lane further by assigning a persistent network resource for transmission of the selected content over the selected lane.

14. The system of claim 11, wherein logic is further configured to cause the processor to bind the selected lane by assigning a dynamic network resource for transmission of the selected content over the selected lane.

15. The system of claim 11, wherein the selected content includes a group of messages from a single publisher.

* * * * *